US012664612B2

(12) United States Patent
Yang

(10) Patent No.: US 12,664,612 B2
(45) Date of Patent: Jun. 23, 2026

(54) IMAGE PROCESSING METHOD, APPARATUS AND SYSTEM, AND STORAGE MEDIUM FOR OBTAINING REAL-TIME VIDEO IMAGE, SELECTING TARGET AREA ON IMAGE FRAME, INPUTTING FIRST IMAGE OF TARGET REGION INTO IMAGE PROCESSING MODEL TO OBTAIN TARGET IMAGE, AND PROVIDING FIRST INTERFACE FOR DISPLAYING TARGET IMAGE ON FIRST INTERFACE

(71) Applicant: BOE Technology Group Co., Ltd., Beijing (CN)

(72) Inventor: Yan Yang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 368 days.

(21) Appl. No.: 18/282,231

(22) PCT Filed: Jan. 3, 2023

(86) PCT No.: PCT/CN2023/070079
§ 371 (c)(1),
(2) Date: Sep. 15, 2023

(87) PCT Pub. No.: WO2023/131111
PCT Pub. Date: Jul. 13, 2023

(65) Prior Publication Data
US 2024/0144429 A1      May 2, 2024

(30) Foreign Application Priority Data

Jan. 5, 2022    (CN) ......................... 202210010633.5

(51) Int. Cl.
*G06T 3/4053* (2024.01)
*G06T 7/11* (2017.01)
(Continued)

(52) U.S. Cl.
CPC .............. *G06T 3/4053* (2013.01); *G06T 7/11* (2017.01); *G06T 7/174* (2017.01); *G06T 7/215* (2017.01);
(Continued)

(58) Field of Classification Search
CPC ......... G06T 3/4053; G06T 7/11; G06T 7/174; G06T 7/215; G06T 2200/24;
(Continued)

(56) References Cited

U.S. PATENT DOCUMENTS 9,699,453 B1    7/2017  Goodman et al.
2011/0169969 A1*  7/2011  Matsuda ............ H04N 1/00204
358/1.15
(Continued)

FOREIGN PATENT DOCUMENTS

CN    103747164 A    4/2014
CN    107333175 A  * 11/2017 ............. H04N 21/44
(Continued)

OTHER PUBLICATIONS

Office Action dated Mar. 6, 2025 for CN202210010633.5 and English Translation.
(Continued)

*Primary Examiner* — Henok Shiferaw
*Assistant Examiner* — Toluwani Mary-Jane Ijaseun
(74) *Attorney, Agent, or Firm* — Ling Wu; Stephen Yang; Ling and Yang Intellectual Property

(57) ABSTRACT

Provided in the embodiments of the present disclosure is an image processing method. The method comprises: acquiring real-time video images; selecting a target area from an image frame, at a selected moment, of the real-time video images; and inputting a first image of the target area into an image processing model to obtain a target image, wherein the resolution of the target image is higher than that of the first
(Continued)

image; and providing a first interface, and displaying the target image on the first interface.

19 Claims, 10 Drawing Sheets

(51) Int. Cl.
 *G06T 7/174*    (2017.01)
 *G06T 7/215*    (2017.01)
(52) U.S. Cl.
 CPC  *G06T 2200/24* (2013.01); *G06T 2207/10016* (2013.01); *G06T 2207/20104* (2013.01); *G06T 2207/30232* (2013.01)
(58) Field of Classification Search
 CPC . G06T 2207/10016; G06T 2207/20104; G06T 2207/30232; G06N 3/04; G06N 3/08
 See application file for complete search history.

(56)     References Cited

U.S. PATENT DOCUMENTS

| | | | | |
|---|---|---|---|---|
| 2012/0141042 A1* | 6/2012 | Iketani | .................. | G06T 3/4053 |
| | | | | 382/238 |
| 2019/0130530 A1* | 5/2019 | Schroers | .............. | G06T 3/4007 |
| 2020/0334789 A1* | 10/2020 | Zhang | .................... | H04N 23/69 |
| 2021/0374908 A1* | 12/2021 | Lin | ........................ | G06T 3/4053 |
| 2022/0164925 A1* | 5/2022 | Park | ..................... | G02B 21/367 |
| 2024/0242309 A1* | 7/2024 | Shi | ......................... | G06T 3/4046 |
| 2025/0117882 A1* | 4/2025 | Milanfar | .............. | G06T 3/4046 |

FOREIGN PATENT DOCUMENTS

| | | | | | |
|---|---|---|---|---|---|
| CN | 107480772 A | | 12/2017 | | |
| CN | 107801009 A | | 3/2018 | | |
| CN | 111489292 A | | 8/2020 | | |
| CN | 111539930 A | * | 8/2020 | .............. | G06T 7/11 |
| CN | 111553846 A | | 8/2020 | | |
| CN | 112565887 A | | 3/2021 | | |
| CN | 113312949 A | | 8/2021 | | |
| CN | 113596350 A | * | 11/2021 | ............. | H04N 5/272 |
| CN | 113852756 A | * | 12/2021 | ........... | H04N 23/632 |
| CN | 113870303 A | | 12/2021 | | |
| CN | 114359051 A | | 4/2022 | | |
| EP | 3297279 A1 | * | 3/2018 | ........... | H04N 9/3188 |
| JP | 2001309206 A | | 11/2001 | | |
| JP | 2015158796 A | | 9/2015 | | |

OTHER PUBLICATIONS

International Search Report for PCT/CN2023/070079 Mailed Mar. 29, 2023.

\* cited by examiner

S1

Acquire real-time video images

S2

Select a target region on an image frame, at a
selected moment, of the real-time video images

S3

Input a first image of the target region into an image
processing model to obtain a target image, a resolution
of the target image being higher than a resolution
of the first image

S4

Provide a first interface and display
the target image on the first interface

FIG. 1

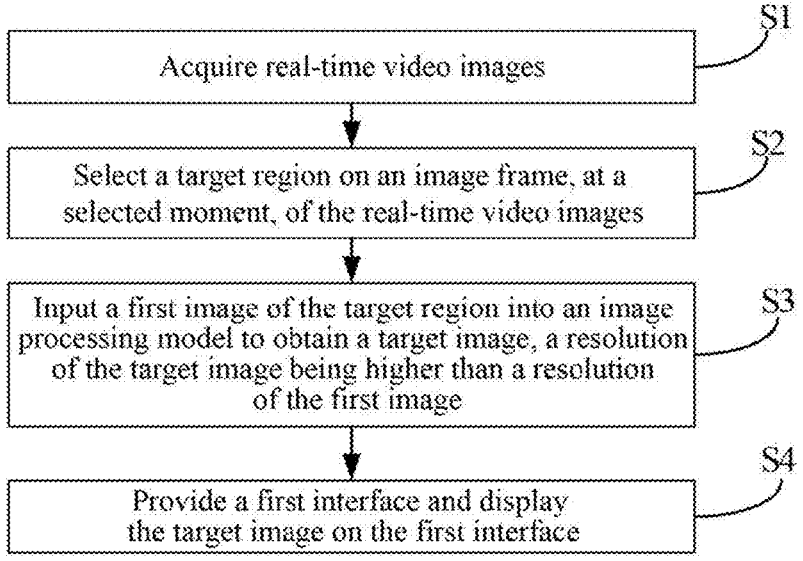

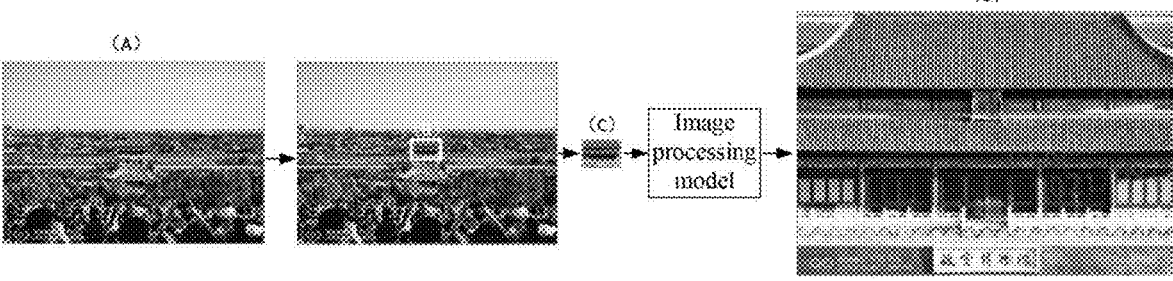

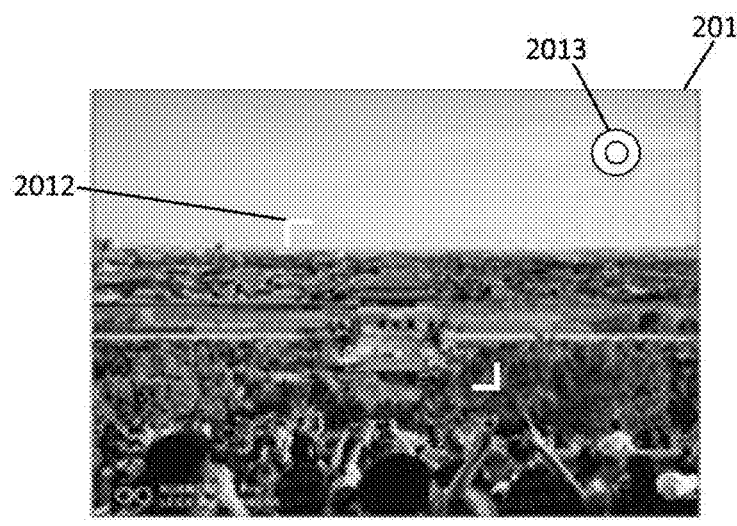

FIG. 3C

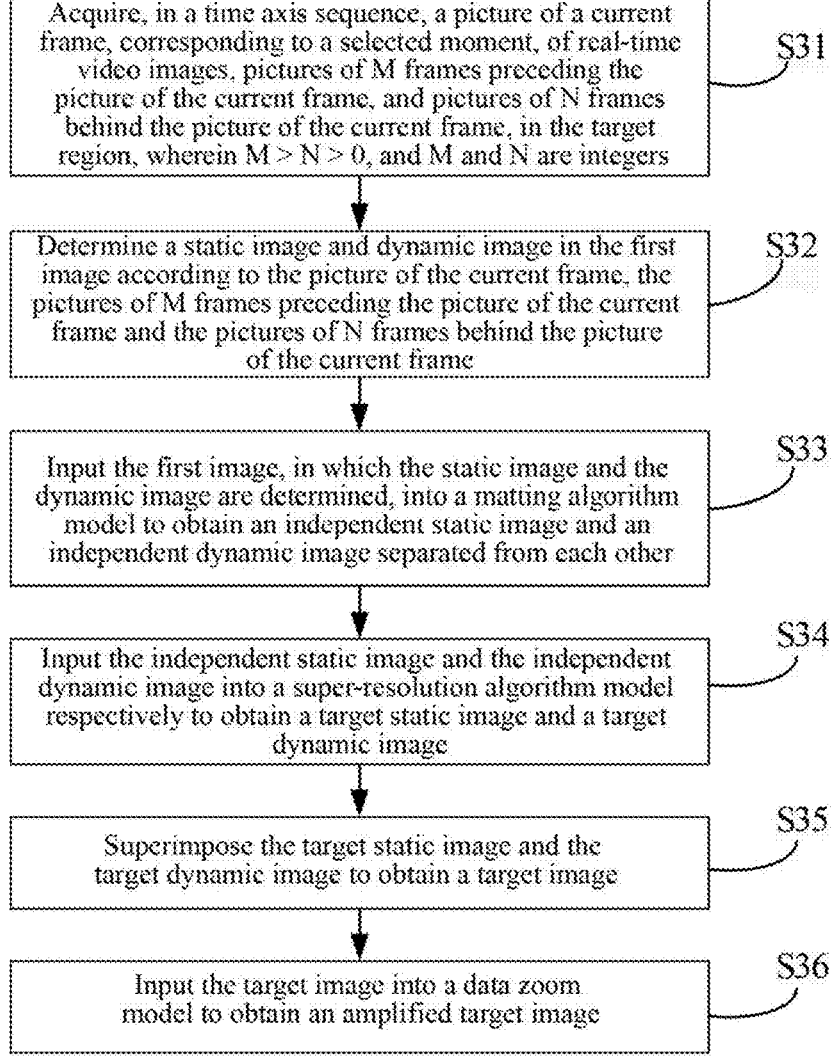

Acquire, in a time axis sequence, a picture of a current frame, corresponding to a selected moment, of real-time video images, pictures of M frames preceding the picture of the current frame, and pictures of N frames behind the picture of the current frame, in the target region, wherein M > N > 0, and M and N are integers — S31

Determine a static image and dynamic image in the first image according to the picture of the current frame, the pictures of M frames preceding the picture of the current frame and the pictures of N frames behind the picture of the current frame — S32

Input the first image, in which the static image and the dynamic image are determined, into a matting algorithm model to obtain an independent static image and an independent dynamic image separated from each other — S33

Input the independent static image and the independent dynamic image into a super-resolution algorithm model respectively to obtain a target static image and a target dynamic image — S34

Superimpose the target static image and the target dynamic image to obtain a target image — S35

Input the target image into a data zoom model to obtain an amplified target image — S36

FIG. 4

(M+N+1) frames                    Time axis

1

IMAGE PROCESSING METHOD, APPARATUS AND SYSTEM, AND STORAGE MEDIUM FOR OBTAINING REAL-TIME VIDEO IMAGE, SELECTING TARGET AREA ON IMAGE FRAME, INPUTTING FIRST IMAGE OF TARGET REGION INTO IMAGE PROCESSING MODEL TO OBTAIN TARGET IMAGE, AND PROVIDING FIRST INTERFACE FOR DISPLAYING TARGET IMAGE ON FIRST INTERFACE

CROSS-REFERENCE TO RELATED APPLICATIONS

The present application is a U.S. National Phase Entry of International Application No. PCT/CN2023/070079 having an international filing date of Jan. 3, 2023, which claims priority of the application No. 202210010633.5, filed to the CNIPA on Jan. 5, 2022. The above-identified applications are hereby incorporated by reference in their entireties.

TECHNICAL FIELD

The present disclosure relates to a technical field of image processing, in particular to an image processing method, apparatus and system, and a storage medium.

BACKGROUND

Security surveillance video needs to achieve an ultra-high definition amplified display of any local region, so as to more clearly view the local details in the video.

SUMMARY

In one aspect, an embodiment of the present disclosure provides an image processing method, including:

acquiring real-time video images;

selecting a target region on an image frame, at a selected moment, of the real-time video images;

inputting a first image of the target region into an image processing model to obtain a target image; wherein a resolution of the target image is higher than a resolution of the first image; and providing a first interface and displaying the target image on the first interface.

In some embodiments, the selecting the target region on an image frame, at a selected moment, of the real-time video images includes: receiving a first instruction input by a user; and selecting the target region on the image frame, at the selected moment, of the real-time video images in response to the first instruction.

In some embodiments, the inputting the first image of the target region into an image processing model to obtain the target image, including: acquiring, in a time axis sequence, in the target region, a picture of a current frame, corresponding to the selected moment, of the target region of the real-time video images, and pictures of M frames preceding the picture of the current frame and pictures of N frames behind the picture of the current frame, wherein M>N>0, and M and N are integers;

determining a static image and a dynamic image in the first image according to the picture of the current frame, and pictures of M frames preceding the picture of the current frame and pictures of N frames behind the picture of the current frame; wherein the static image is an image of an object in the first image whose position remains unchanged relative to the pictures of M frames preceding the picture of the current frame and the pictures of N frames behind the picture of the current frame; and the dynamic image is an image of an object in the first image whose position changes relative to the pictures of M frames preceding the picture of the current frame and the pictures of N frames behind the picture of the current frame;

inputting the first image in which the static image and the dynamic image are determined into a matting algorithm model to obtain an independent static image and an independent dynamic image separated from each other;

inputting the independent static image and the independent dynamic image into a super-resolution algorithm model respectively to obtain a target static image and a target dynamic image; and superimposing the target static image and the target dynamic image to obtain the target image.

In some embodiments, the determining the static image and the dynamic image in the first image according to the picture of the current frame and the pictures of M frames preceding the picture of the current frame and the pictures of N frames behind the picture of the current frame includes:

comparing the first image of the picture of the current frame with the pictures of M frames preceding the picture of the current frame and the pictures of N frames behind the picture of the current frame, recognizing an image of an object in the first image whose position remains unchanged relative to the pictures of M frames preceding the picture of the current frame and the pictures of N frames behind the picture of the current frame, and determining the image as the static image; and comparing the first image of the picture of the current frame with the pictures of M frames preceding the picture of the current frame and the pictures of N frames behind the picture of the current frame, recognizing an image of an object in the first image whose position changes relative to the pictures of M frames preceding the picture of the current frame and the pictures of N frames behind the picture of the current frame, and determining the image as the dynamic image.

In some embodiments, the determining the static image and the dynamic image in the first image according to the picture of the current frame and the pictures of M frames preceding the picture of the current frame and the pictures of N frames behind the picture of the current frame includes:

extracting, in a time axis sequence, at an interval of a set time period, one-frame picture from the picture of the current frame, the pictures of M frames preceding the picture of the current frame and the pictures of N frames behind the picture of the current frame to obtain X frames of pictures; wherein 0<X<M+N+1, and X is an integer;

comparing the first image of the picture of the current frame with the X frames of pictures, recognizing an image of an object in the first image whose position remains unchanged relative to the X frames of pictures, and determining it as the static image; and comparing the first image of the picture of the current frame with the X frames of pictures, recognizing an image of an object in the first image whose position changes relative to the X frames of pictures, and determining it as the dynamic image.

In some embodiments, the determining the static image and the dynamic image in the first image according to the picture of the current frame and pictures of M frames preceding the picture of the current frame and pictures of N frames behind the picture of the current frame includes:

receiving a picture of a static object input by a user, wherein the static object is a static object in the first image;

comparing the first image of the picture of the current frame, and the pictures of M frames preceding the picture of the current frame and the pictures of N frames behind the picture of the current frame with the picture of the static object, respectively, and determining, as the dynamic image, an image of an object in the first image and the pictures of M frames preceding the picture of the current frame and the pictures of N frames behind the picture of the current frame whose position changes relative to the picture of the static object.

In some embodiments, the determining the static image and the dynamic image in the first image according to the picture of the current frame and pictures of M frames preceding the picture of the current frame and pictures of N frames behind the picture of the current frame includes:

receiving a picture of a static object input by a user, wherein the static object is a static object in the first image;

extracting, in a time axis sequence, at an interval of a set time period, one-frame picture from the picture of the current frame, and pictures of M frames preceding the picture of the current frame and pictures of N frames behind the picture of the current frame to obtain X frames of pictures; wherein 0<X<M+N+1, and X is an integer;

comparing the first image of the picture of the current frame, and the X frames of pictures with the picture of the static object, respectively, and determining, as the dynamic image, an image of an object in the first image and the X frames of pictures whose position changes relative to the picture of the static object.

In some embodiments, the image processing method further includes: inputting the target image into a data zoom model to obtain an amplified target image.

In some embodiments, one super-resolution processing is performed on the independent static image at an interval of a set time period in a time axis sequence; and a super-resolution processing is performed in real time on the independent dynamic image.

In some embodiments, a resolution of the first image is any one of 2k, 4k, and 8k.

In some embodiments, the target region is a partial region or entire region of an image frame, at a selected moment, of the real-time video images.

In another aspect, an embodiment of the present disclosure further provides an image processing method, including:

acquiring real-time video images;

selecting a target region on an image frame at a selected moment of the real-time video images;

inputting a first image of the target region into an image processing model to obtain a target image; wherein a resolution of the target image is higher than a resolution of the first image; and providing a first interface, and displaying the target image on the first interface;

wherein the inputting the first image of the target region into an image processing model to obtain the target image, includes:

acquiring, in a time axis sequence, in the target region, a picture of a current frame corresponding to the selected moment of the real-time video images, and pictures of M frames preceding the picture of the current frame and pictures of N frames behind the picture of the current frame, wherein M>N>0, and M and N are integers;

dividing the first image into a first region and a second region, wherein an image in the first region is a static image, and an image in the second region is a static image and a dynamic image; wherein the static image is an image of an object in the first image whose position remains unchanged relative to the pictures of M frames preceding the picture of the current frame and the pictures of N frames behind the picture of the current frame, and the dynamic image is an image of an object in the first image whose position changes relative to the pictures of M frames preceding the picture of the current frame and the pictures of N frames behind the picture of the current frame;

determining the static image and dynamic image in the image in the second region according to the picture of the current frame, and pictures of M frames preceding the picture of the current frame and pictures of N frames behind the picture of the current frame;

inputting the first image in which the static image and the dynamic image are determined into a matting algorithm model to obtain an independent static image and an independent dynamic image separated from each other;

inputting the independent static image and the independent dynamic image into a super-resolution algorithm model respectively to obtain a target static image and a target dynamic image;

superimposing the target static image and the target dynamic image to obtain the target image;

the determining the static image and the dynamic image in the image in the second region according to the picture of the current frame and pictures of M frames preceding the picture of the current frame and pictures of N frames behind the picture of the current frame includes:

comparing the image in the second region with the pictures of M frames preceding the picture of the current frame and the pictures of N frames behind the picture of the current frame, recognizing an image of an object in the image in the second region whose position remains unchanged relative to the pictures of M frames preceding the picture of the current frame and the pictures of N frames behind the picture of the current frame, and determining the image as the static image;

comparing the image in the second region with the pictures of M frames preceding the picture of the current frame and the pictures of N frames behind the picture of the current frame, recognizing an image of an object in the image in the second region whose position changes relative to the pictures of M frames preceding the picture of the current frame and the pictures of N frames behind the picture of the current frame, and determining the image as the dynamic image;

or, extracting, in a time axis sequence, at an interval of a set time period, one-frame picture from the picture of the current frame and pictures of M frames preceding the picture of the current frame and pictures of N frames behind the picture of the current frame to obtain X frames of pictures; wherein 0<X<M+N+1, and X is an integer;

comparing the image in the second region with the X frames of pictures, recognizing an image of an object in the image in the second region whose position remains unchanged relative to the X frames of pictures, and determining the image as the static image;

comparing the image in the second region with the X frames of pictures, recognizing an image of an object in the image in the second region whose position changes relative to the X frames of pictures, and determining the image as the dynamic image;

or, receiving a picture of a static object input by a user, wherein the static object is a static object in the first image;

comparing the image in the second region and the pictures of M frames preceding the picture of the current frame and the pictures of N frames behind the picture of the current frame with the picture of the static object, respectively, and determining, as the dynamic image, an image of the an object in the image in the second region and the pictures of M frames preceding the picture of the current frame and the pictures of N frames behind the picture of the current frame whose position changes relative to the picture of the static object;

or, receiving a picture of a static object input by a user, wherein the static object is a static object in the first image;

extracting, in a time axis sequence, at an interval of a set time period, one-frame picture from the picture of the current frame the pictures of M frames preceding the picture of the current frame and the pictures of N frames behind the picture of the current frame to obtain X frames of pictures; wherein $0<X<M+N+1$, and X is an integer; and comparing the image in the second region and the X frames of pictures with the picture of the static object, respectively, and determining, as the dynamic image, an image of an object, in the image in the second region and the X frames of pictures, whose position changes relative to the picture of the static object.

In another aspect, an embodiment of the present disclosure also provides an image processing apparatus, including: a memory, storing one or more computer programs thereon; and a processor, coupled to the memory, and configured to execute the one or more computer programs to implement the above image processing method.

In yet another aspect, an embodiment of the present disclosure also provides a non-transitory computer-readable storage medium storing a computer programs which, when running on the computer, enables the computer to implement the above image processing method.

In yet another aspect, an embodiment of the present disclosure further provides an electronic device, including the above image processing apparatus and a display apparatus; wherein the display apparatus is configured as a first interface.

In yet another aspect, an embodiment of the present disclosure further provides an image processing system, including: the above image processing apparatus, and further including: a video image acquisition apparatus, a video image transmission processing apparatus and a display apparatus.

The video image acquisition apparatus acquires real-time video images and transmits the real-time video images to the video image transmission processing apparatus.

The video image transmission processing apparatus receives the real-time video images and transmits the real-time video images to the image processing apparatus.

The image processing apparatus processes the real-time video images to obtain a target image and transmits the target image to the display apparatus.

The display apparatus receives the target image and displays it.

In some embodiments, the display apparatus is a projection screen or a display terminal with a resolution consistent with a resolution of the target image.

BRIEF DESCRIPTION OF DRAWINGS

The accompanying drawings are used to provide a further understanding of the embodiments of the present disclosure, and constitute a part of the specification. They are used together with the embodiments of the present application to explain the present disclosure, and do not constitute a restriction on the present disclosure. The above and other features and advantages will become more apparent to those skilled in the art by describing detailed example embodiments with reference to the accompanying drawings.

FIG. 1 is a flowchart of an image processing method provided by an embodiment of the present disclosure.

FIG. 2 is a diagram of a principle of an image processing method provided by an embodiment of the present disclosure.

FIG. 3C is yet another schematic diagram of selecting a target region on an image frame, at a selected moment, of a real-time video image provided by an embodiment of the present disclosure.

FIG. 4 is a flowchart of acquiring a target image in an embodiment of the present disclosure.

DETAILED DESCRIPTION

Figures 3A, 3B:
FIG. 3A is a schematic diagram of selecting a target region on an image frame, at a selected moment, of a real-time video image provided by an embodiment of the present disclosure.
FIG. 3B is another schematic diagram of selecting a target region on an image frame, at a selected moment, of a real-time video image provided by an embodiment of the present disclosure.

To make those skilled in the art better understand technical solutions of the embodiments of the present disclosure, the image processing method, device and system, and a storage medium provided by the embodiments of the present disclosure are further described in detail with reference to the drawings and specific implementations.

Embodiments of that present disclosure will be described more fully hereinafter with reference to the accompany drawings, but the illustrated embodiments may be embodied in different forms and should not be construed as limitations to the embodiments set forth in the present disclosure. On the contrary, these embodiments are provided for the purpose of making the present disclosure thorough and complete, and will enable those skilled in the art to fully understand the scope of the present disclosure.

Embodiments of the present disclosure are not limited to the embodiments shown in the drawings, but include modifications of configurations based on manufacturing processes. Therefore, the regions illustrated in the drawings have schematic properties, and the shapes of the regions shown in the drawings illustrate the specific shapes of the regions, but are not intended to be limiting.

Hereinafter, terms "first" and "second" are only used for description and should not be construed as indicating or implying relative importance or implicitly indicating the number of indicated technical features. Therefore, features defined with "first" and "second" may explicitly or implicitly include one or more these features. In the descriptions of the present disclosure, "multiple" means two or more than two, unless otherwise specified.

The expressions of "coupled" and "connected" and their extensions may be used when describing some embodiments. For example, the term "connected" may be used when describing some embodiments to indicate that two or more components are in direct physical or electrical contact with each other. For another example, the term "coupled" may be used when describing some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents of the disclosure.

The use of "suitable for" or "configured to" herein implies an open and inclusive language that does not exclude a device suitable for or configured to perform an additional task or act.

In related technologies, local details of video images need to be amplified to achieve a clearer display of local details in security scenes, and traditional digital zoom will lose clarity while amplifying images.

An embodiment of the present disclosure provides an image processing method. Referring to FIG. 1 and FIG. 2, FIG. 1 is a flowchart of an image processing method provided by an embodiment of the present disclosure, and FIG. 2 is a diagram of a principle of an image processing method provided by an embodiment of the present disclosure. The image processing method includes following acts.

At act S1, real-time video images are acquired.

Exemplarily, 8K real-time video is captured by an ultra-high definition security camera with a resolution of 8K (7680×4320). Optionally, the real-time video images may also be a 2K (1920×1080) or 4K (4096×2160) video.

Exemplarily, the video images may be a security surveillance video, such as a security surveillance video for a particular location region (street corner, road segment, particular building at different angles, etc.). The video image is shown as (A) in FIG. 2.

At act S2, a target region on an image frame, at a selected moment, of the real-time video images is selected.

Exemplarily, the selected moment is the time when the user selects and determines a region of interest. The target region is a region where details need to be displayed more clearly. For example, the target region is a region where suspicious situations occur in the security surveillance video. The target region is shown as (B) in FIG. 2.

In some embodiments, the target region is a local region or an entire region of an image frame, at a selected moment, of the real-time video images. Exemplarily, for 2K and 4K video images, the target region may be a local region (e.g. a ¼, ½ or ⅛ of the entire region) or the entire region of the image frame at the selected moment. Exemplarily, for an 8K video image, the target region is a local region smaller than the entire region of the image frame at the selected moment, for example, a ¼, ½, or ⅛ region of the image frame at the selected moment, which is not specifically limited here.

In some embodiments, selecting the target region on the image frame, at the selected moment, of the real-time video images includes: providing a second interface for displaying an instruction input by a user, such as a first instruction input by the user, receiving the first instruction input by the user, and selecting a target region on the image frame, at a selected moment, of the real-time video images in response to the first instruction.

Herein, the selected moment is determined according to the first instruction input by the user, and exemplarily, the selected moment may be the time when the first instruction input by the user is received; and the selected moment may also be a time point self-defined by the user.

Exemplarily, the second interface is an interface of the image frame at a selected moment; and the second interface and the first interface for displaying the target image may be two different display interfaces or may be the same display interface. Exemplarily, the first instruction input by the user includes a gesture instruction, a voice instruction, and an infrared remote control instruction.

For example, referring to FIG. 3A, it is a schematic diagram of selecting a target region on an image frame, at a selected moment, of real-time video images. When the first instruction is a voice instruction, the second interface 201 may display a first prompt 2011 of "Please say: start selecting a region", the user inputs a voice instruction of "start selecting a region". Referring to FIG. 3A, the second interface 201 displays a marquee icon 2012, and the user may set a position and a size of a region framed by the marquee icon 2012, thereby selecting a target region of interest on the video image.

For example, referring to FIG. 3B, it is another schematic diagram of selecting a target region on an image frame, at a selected moment, of the real-time video images. When the first instruction is a gesture instruction, the second interface 201 may display a first prompt 2011 of "Start selecting a region using a "marquee" gesture", the user inputs a "marquee" gesture, the second interface 201 displays a marquee icon 2012, and the user may set a position and a size of a region framed by the marquee icon 2012, thereby selecting a target region of interest on the video image. Optionally, the gesture instruction may also be other common gestures such as "scissors hand" and "praise", and the first prompt displayed on the second interface may also be adjusted adaptively, which is not specifically limited here.

Optionally, referring to FIG. 3C, it is yet another schematic diagram of selecting a target region on an image frame, at a selected moment, of real-time video images. The user may also trigger a region selection by pressing a key, for example, the user uses a remote controller to press an "OK" key, the second interface 201 displays a marquee button 2013, the user clicks the marquee button 2013, the second interface 201 displays a marquee icon 2012, and the user may set a position and a size of a region framed by the marquee icon 2012, thereby selecting a target region of interest on the video image. Optionally, the keys for determining the selection region of the remote controller may also be other keys such as "selection region" key, "confirmation" key, etc., which are not specifically limited here.

In some other embodiments, the above keys may be physical keys or virtual keys on a touch screen, and the remote controller may be an infrared emitting apparatus with physical keys, may also be an electronic device with a touch screen and having an infrared emitting function, which is not limited here.

It should be noted that the voice instruction, the gesture instruction or the key instruction corresponding to the first instruction may be set in advance or self-defined by the user. After the user inputs the first instruction, whether a marquee icon is displayed on the second interface 201 may be self-defined by the user, or the marquee icon may not be displayed.

At act S3, a first image of the target region is input into an image processing model to obtain a target image, wherein a resolution of the target image is higher than a resolution of the first image.

Herein, the first image is all images within the selected target region on the image frame, at the selected moment, of the real-time video images.

In some embodiments, referring to FIG. 4, it is a flowchart of acquiring a target image in an embodiment of the present disclosure. Inputting the first image of the target region into the image processing model to obtain a target image includes the following acts.

At act S31, a picture of a current frame, corresponding to the selected moment, of the target region of the real-time video images, and pictures of M frames preceding the picture of the current frame and pictures of N frames behind the picture of the current frame are acquired in a time axis sequence, wherein M>N>0, and M and N are integers.

Herein, the picture of the current frame, corresponding to the selected moment, of the target region of the real-time video images is an image frame, at the selected moment, of the real-time video images, and the first image is a first image of the target region on the picture of the current frame.

Exemplarily, frame pictures within the 10 seconds preceding the picture of the current frame and frame pictures within the 2 seconds behind the picture of the current frame are acquired, and pictures of 25-30 frames are refreshed within one second. The selection of the pictures of frames preceding the picture of the current frame and the pictures of frames behind the picture of the current frame may also be frame pictures within the 20 seconds or 10 minutes preceding the picture of the current frame and frame pictures within the 5 seconds or 2 minutes behind the picture of the current frame. The selection of the pictures of frames preceding and behind the picture of the current frame is not limited here.

It should be noted that the more frames are selected, the more accurate the determination of static image and dynamic image in the first image is, and thus the better the effect of the subsequently obtained target image is.

At act S32, a static image and a dynamic image in the first image are determined according to the picture of the current frame, and pictures of M frames preceding the picture of the current frame and pictures of N frames behind the picture of the current frame; wherein the static image is an image of an object in the first image whose position remains unchanged relative to the pictures of M frames preceding the picture of the current frame and the pictures of N frames behind the picture of the current frame; and the dynamic image is an image of an object in the first image whose position changes relative to the pictures of M frames preceding the picture of the current frame and the pictures of N frames behind the picture of the current frame.

In some embodiments, the act S32 includes act S321 and act S322. At the act S321, the first image of the picture of the current frame is compared with the pictures of M frames preceding the picture of the current frame and the pictures of N frames behind the picture of the current frame, and an image of an object in the first image whose position remains unchanged relative to the pictures of M frames preceding the picture of the current frame and the pictures of N frames behind the picture of the current frame is recognized, and determined as a static image.

At the act S322, the first image of the picture of the current frame is compared with the pictures of M frames preceding the picture of the current frame and the pictures of N frames behind the picture of the current frame, and an image of an object in the first image whose position changes relative to the pictures of M frames preceding the picture of the current frame and the pictures of N frames behind the picture of the current frame is recognized and determined as a dynamic image.

Figure 5:
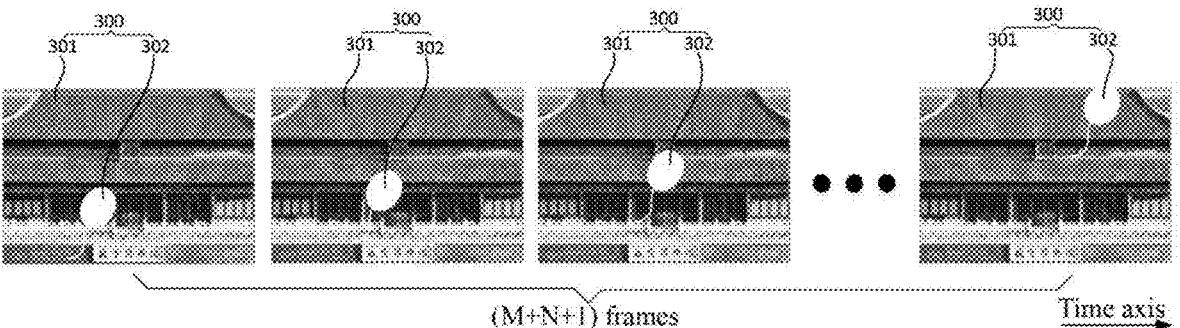
FIG. 5 is a schematic diagram of an approach for determining a static image and a dynamic image in a first image provided by an embodiment of the present disclosure.

Exemplarily, as shown in FIG. 5, it is a schematic diagram of an approach for determining a static image and a dynamic image in a first image. In the picture of the current frame and pictures of M frames preceding the picture of the current frame and pictures of N frames behind the picture of the current frame that are continuous, a position of the "Palace Museum Tower" in the first image 300 remains unchanged relative to the pictures of M frames preceding the picture of the current frame and the pictures of N frames behind the picture of the current frame; therefore, the "Palace Museum Tower" in the first image 300 is determined as the static image 301; and a position of the "balloon" in the first image 300 changes relative to the pictures of M frames preceding the picture of the current frame and the pictures of N frames behind the picture of the current frame, so the "balloon" in the first image 300 is determined as the dynamic image 302.

Herein, in the scheme of determining the static image and dynamic image in acts S321-S322, traversal comparisons are performed between the first image of the picture of the current frame, and the pictures of M frames preceding the picture of the current frame and the pictures of N frames behind the picture of the current frame, and as long as a position of an object in the first image changes relative to at least two-frames pictures, the image of this object is determined as a dynamic image, and the image of the object in the first image whose position remains constantly unchanged relative to the selected all-frames pictures is determined as a static image. Although the comparison process in the approach for determining a dynamic image and a static image is relatively complicated and takes a long time, the determination of the static image and the dynamic image is more accurate.

In some embodiments, the act S32 includes act S321', act S322' and act S323'. At the act S321', in a time axis sequence, one-frame picture is extracted at an interval of a set time period from the picture of the current frame, the pictures of M frames preceding the picture of the current frame and the pictures of N frames behind the picture of the current frame to obtain X frames of pictures; wherein 0<X<M+N+1, and X is an integer.

At the act S322', the first image of the picture of the current frame is compared with the X frames of pictures, and an image of an object in the first image whose position remains unchanged relative to the X frames of pictures is recognized and determined as a static image.

At the act S323', the first image of the picture of the current frame is compared with the X frames of pictures, and an image of an object in the first image whose position changes relative to the X frames of pictures is recognized and determined as a dynamic image.

Figure 6:
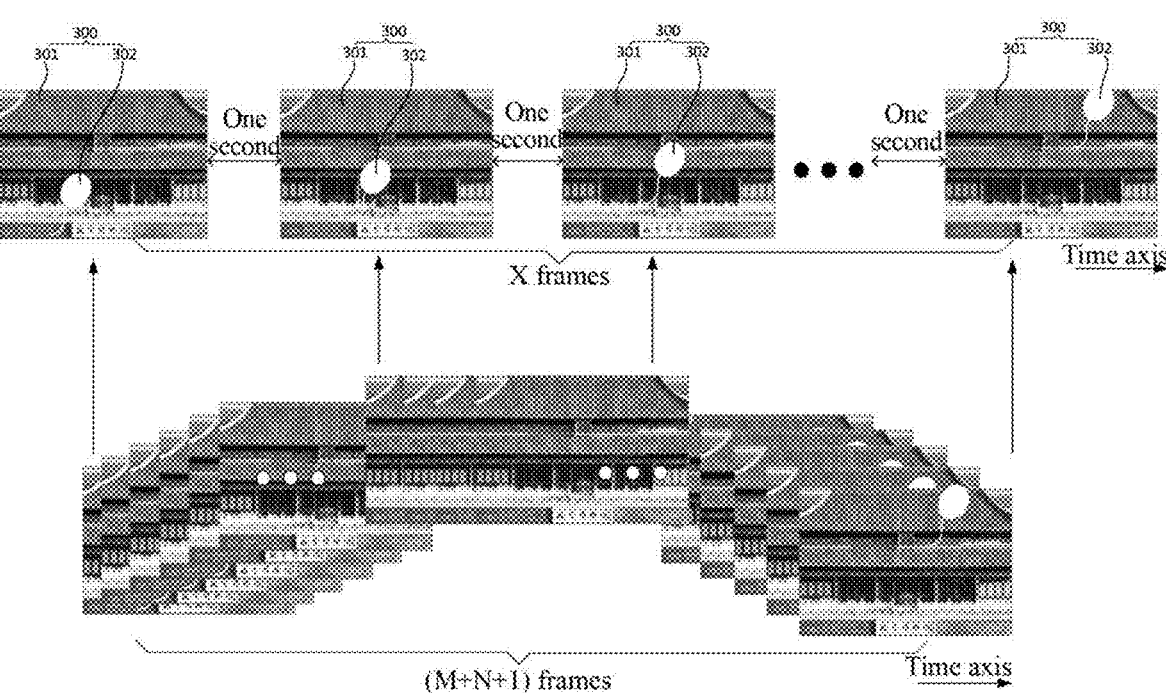
FIG. 6 is a schematic diagram of another approach for determining a static image and a dynamic image in a first image provided by an embodiment of the present disclosure.

Exemplarily, as shown in FIG. 6, it is a schematic diagram of another approach for determining a static image and a dynamic image in a first image. In a time axis sequence, one-frame picture is extracted from the continuous current-frame, the pictures of M frames preceding the picture of the current frame and the pictures of N frames behind the picture of the current frame at an interval of 1 second, and a total of X frames of pictures are extracted (wherein the X frames of pictures may be extracted from frames pictures within a period lasting 10-20 minutes or more than 30 minutes). The first image 300 of the picture of the current frame is compared with the X frames of pictures; a position of the "Palace Museum Tower" in the first image 300 remains unchanged relative to the X frames of pictures, so the "Palace Museum Tower" in the first image 300 is determined as a static image 301; and a position of the "balloon" in the first image 300 changes relative to the X frames of pictures, so the "balloon" in the first image 300 is determined as a dynamic image 302.

In the scheme of determining a static image and a dynamic image in the acts S321'-S323', the X frames of pictures are extracted from the picture of the current frame, pictures of M frames preceding the picture of the current frame and pictures of N frames behind the picture of the current frame that are continuous at an interval of equal time, and then traversal comparisons are performed between the first image of the picture of the current frame and the X frames of pictures. As long as a position of an object in the first image changes relative to that in at least two frames, the image of this object is determined as a dynamic image; and an image of an object in the first image whose position remains constantly unchanged relative to the extracted X frames of pictures is determined as a static image. The approach for determining a static image and a dynamic image in such a way not only simplifies the comparison process and shortens the time consumption, but also obtains more accurate results of determining the static image and the dynamic image.

In some embodiments, the act S32 includes: act S321" and act S322". At act S321", an image of a static object in a first image input by a user is received.

At act S321", the first image of the picture of the current frame and the pictures of M frames preceding the picture of the current frame and the pictures of N frames behind the picture of the current frame are compared with the picture of the static object, respectively, and an image of an object, in the first image and the pictures of M frames preceding the picture of the current frame and the pictures of N frames behind the picture of the current frame, whose position changes relative to the picture of the static object is determined as a dynamic image.

Figure 7:
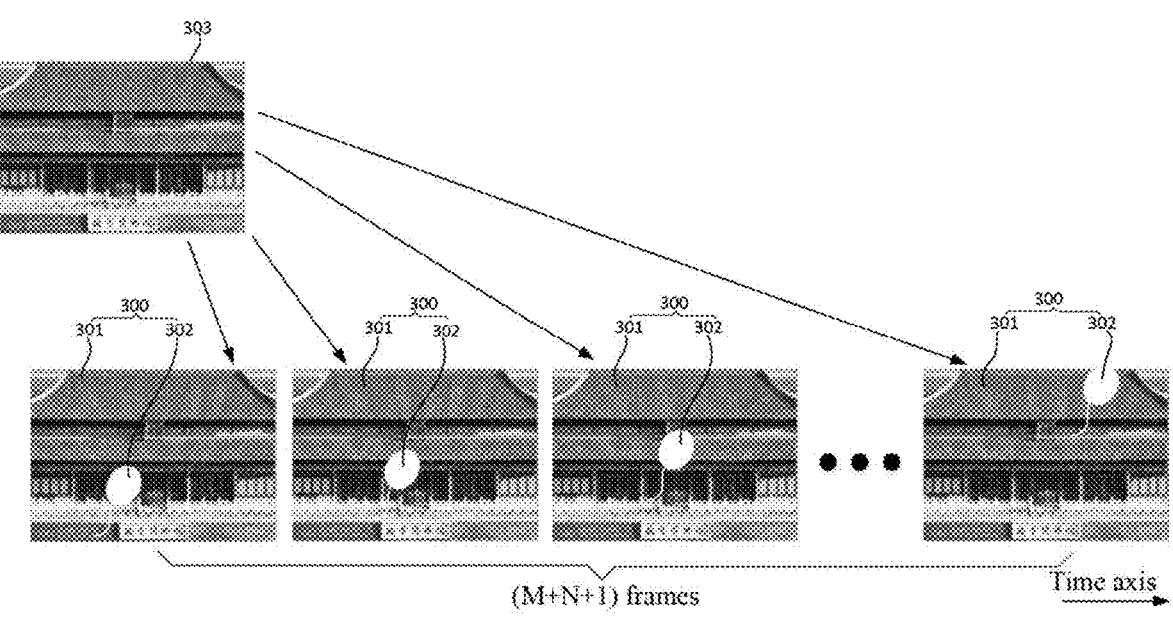
FIG. 7 is a schematic diagram of yet another approach for determining a static image and a dynamic image in a first image provided by an embodiment of the present disclosure.

Exemplarily, as shown in FIG. 7, it is a schematic diagram of yet another approach for determining a static image and a dynamic image in a first image. A picture of a static object 303 (such as "Palace Museum Tower") in the first image input by the user is received; then the first image 300 of the picture of the current frame and the pictures of M frames preceding the picture of the current frame and the pictures of N frames behind the picture of the current frame are compared with the picture of the static object 303 one by one according to a refresh time order of a frame picture. An image of an object in the first image 300, and the pictures of M frames preceding the picture of the current frame and the pictures of N frames behind the picture of the current frame, whose position changes relative to the picture of the static object 303, is determined as a dynamic image 302. Accordingly, an image of an object, in the first image 300 and the pictures of M frames preceding the picture of the current frame and the pictures of N frames behind the picture of the current frame, whose position remains constantly unchanged relative to the picture of the static object 303, is determined as a static image 301.

In the scheme of determining a static image and a dynamic image in the acts S321"-S322", the picture of the static object in the first image is input as a comparison object, and then the first image of the picture of the current frame and the pictures of M frames preceding the picture of the current frame and the pictures of N frames behind the picture of the current frame are compared with the picture of the static object one by one. As long as a position of an object in the first image changes relative to the picture of the static object, the image of this object is determined as a dynamic image; and an image of an object in the first image whose position remains constantly unchanged relative to the picture of the static object is determined as a static image. The approach for determining a static image and a dynamic image in such a way also simplifies the comparison process and takes shorter time, and further obtains more accurate results of determining a static image and a dynamic image.

In some embodiments, the act S32 includes: act S321''', act S322''' and act S322'''. At act S321''', a picture of a static object input by a user is received, wherein the static object is a static object in the first image.

At act S322''', in a time axis sequence, one-frame picture is extracted at an interval of a set time period from the picture of the current frame, the pictures of M frames preceding the picture of the current frame and the pictures of N frames behind the picture of the current frame to obtain X frames of pictures; wherein 0<X<M+N+1, and X is an integer.

At act S323''', the first image of the picture of the current frame and the X frames of pictures are compared with the picture of the static object, respectively, and an image of an object in the first image and the X frames of pictures whose position changes relative to the picture of the static object is determined as a dynamic image. Accordingly, an image of an object whose position is unchanged relative to the static image in the first image and the X frames of pictures is determined as a static image.

Figure 8:
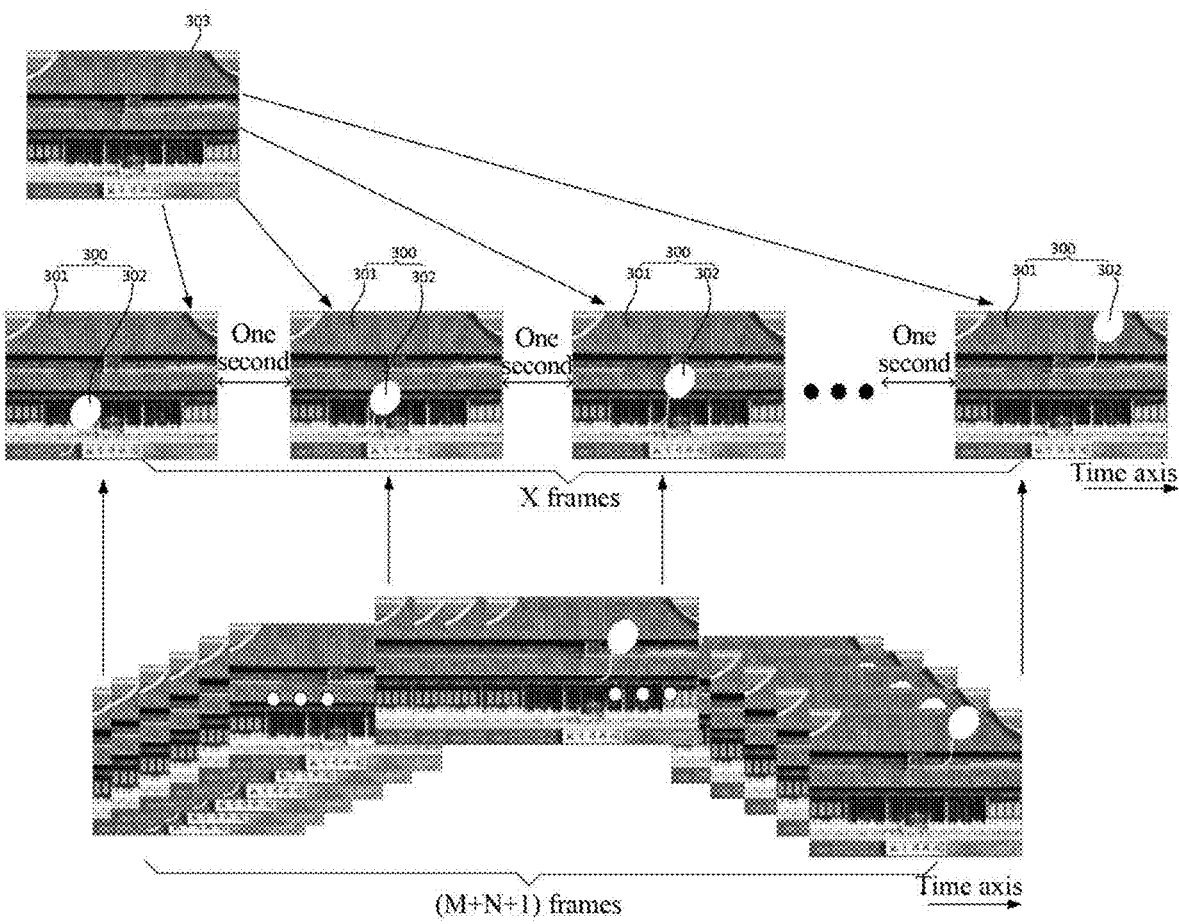
FIG. 8 is a schematic diagram of still yet another approach for determining a static image and a dynamic image in a first image provided by an embodiment of the present disclosure.

Exemplarily, as shown in FIG. 8, it is a schematic diagram of yet another approach for determining a static image and a dynamic image in a first image. A picture of a static object 303 (such as "Palace Museum Tower") in the first image input by the user is received. In a time axis sequence, one frame is extracted at an interval of 1 second from the picture of the current frame, pictures of M frames preceding the picture of the current frame and pictures of N frames behind the picture of the current frame that are continuous, and a total of X frames of pictures are extracted (wherein the X frames of pictures may be extracted from pictures of frames in a period lasting 10-20 minutes or more than 30 minutes). The first image 300 of the picture of the current frame in the X frames of pictures and the X frames of pictures are compared with the picture of the static object 303 one by one, and a position of the "Palace Museum Tower" in the first image 300 and the X frames of pictures remains unchanged relative to the picture of the static object 303, so the "Palace Museum Tower" in the first image 300 is determined as a static image 301. A position of a "balloon" in the first image 300 and the X frames of pictures changes in one or more comparisons with the picture of the static object 303, so the "balloon" in the first image 300 is determined as a dynamic image 302.

The scheme of determining a static image and a dynamic image in the acts S321"-S323" combines the schemes for determining a static image and a dynamic image in FIG. 6 and FIG. 7, which thus can further simplify the comparison process, shorten the comparison time consumption, and further make the results of determining the static image and the dynamic image more accurate.

Figure 9:
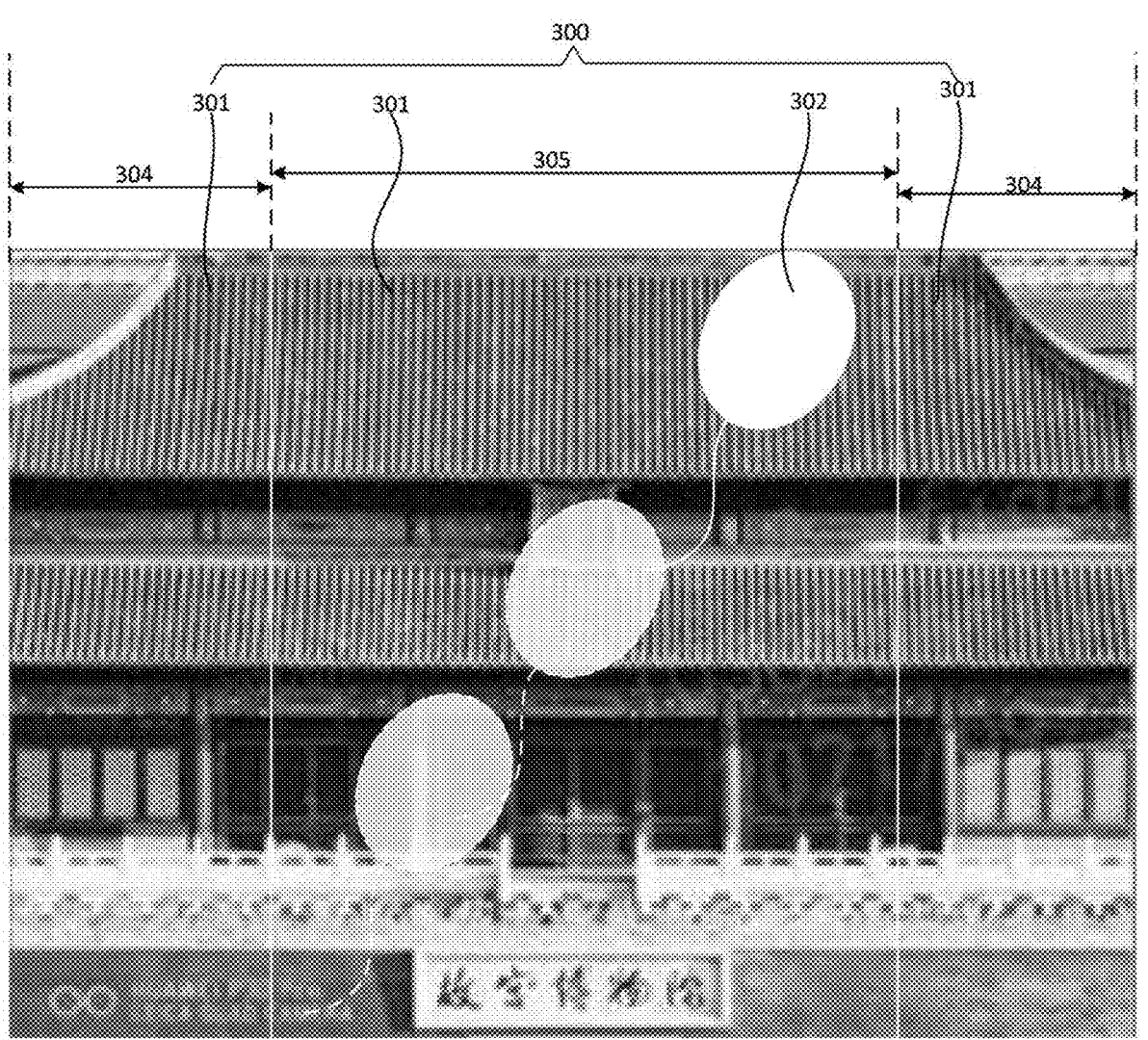
FIG. 9 is a schematic diagram of partitioning a first image provided by an embodiment of the present disclosure.

In some embodiments, the act S32 includes: as shown in FIG. 9 which is a schematic diagram of partitioning the first image, dividing the first image 300 into a first region 304 and a second region 305, wherein an image within the first region 304 is a static image 301, and images within the second region 305 are a static image 301 and a dynamic image 302; and determining the static image 301 and the dynamic image 302 in the image within the second region 305 according to the picture of the current frame and the pictures of M frames preceding the picture of the current frame and pictures of N frames behind the picture of the current frame. Herein, the determining the static image 301 and the dynamic image 302 in the image within the second region 305 according to the picture of the current frame and the pictures of M frames preceding the picture of the current frame and pictures of N frames behind the picture of the current frame specifically includes: performing a processing approach in any one of FIG. 5 to FIG. 8 on the image within the second region 305 to determine the static image 301 and the dynamic image 302 in the second region 305. This can further simplify the comparison process, shorten the comparison time consumption, and further make the results of determining a static image and a dynamic picture more accurate.

In some embodiments, performing the processing approach in FIG. 5 on the image within the second region 305 to determine the static image 301 and the dynamic image 302 in the second region 305 includes: comparing the image within the second region 305 with the pictures of M frames preceding the picture of the current frame and pictures of N frames behind the picture of the current frame, recognizing an image of an object whose position remains unchanged relative to the pictures of M frames preceding the picture of the current frame and the pictures of N frames behind the picture of the current frame in the image within the second region 305, and determining it as the static image 301; and comparing the image within the second region 305 with the pictures of M frames preceding the picture of the current frame and the pictures of N frames behind the picture of the current frame, recognizing an image of an object whose position changes relative to the pictures of M frames preceding the picture of the current frame and the pictures of N frames behind the picture of the current frame in the image within the second region 305, and determining it as the dynamic image 302.

In some embodiments, performing the processing approach in FIG. 6 on the image within the second region 305 to determine the static image 301 and the dynamic image 302 in the second region 305 includes: in a time axis sequence, extracting one frame from the picture of the current frame and pictures of M frames preceding the picture of the current frame and pictures of N frames behind the picture of the current frame at an interval of a set time period to obtain X frames of pictures, wherein $0<X<M+N+1$, and X is an integer; comparing the image within the second region 305 with the X frames of pictures, recognizing an image of an object in the image within the second region 305 whose position remains unchanged relative to the X frames of pictures and determining it as the static image 301; and comparing the image within the second region 305 with the X frames of pictures, recognizing an image of an object in the image within the second region 305 whose position changes relative to the X frames of pictures and determining it as the dynamic image 302.

In some embodiments, performing the processing approach in FIG. 7 on the image within the second region 305 to determine the static image 301 and the dynamic image 302 within the second region 305 includes: receiving a picture of a static object 303 in the first image 300 input by a user; comparing the image within the second region 305 and the pictures of M frames preceding the picture of the current frame and pictures of N frames behind the picture of the current frame with the picture of the static object 303, respectively, and determining an image of an object, whose position changes relative to the picture of the static object 303, in the image within the second region 305 and the pictures of M frames preceding the picture of the current frame and the pictures of N frames behind the picture of the current frame as the dynamic image 302; accordingly, determining an image of an object, whose position remains unchanged relative to the picture of the static object 303, in the image within the second region 305 and the pictures of M frames preceding the picture of the current frame and the pictures of N frames behind the picture of the current frame as the static image 301.

In some embodiments, performing the processing approach in FIG. 8 on the image within the second region 305 to determine the static image 301 and the dynamic image 302 within the second region 305 includes: receiving a picture of a static object 303 in the first image 300 input by a user; in a time axis sequence, extracting one frame from the picture of the current frame and the pictures of M frames preceding the picture of the current frame and the pictures of N frames behind the picture of the current frame at an interval of a set time period to obtain X frames of pictures, wherein $0<X<M+N+1$, and X is an integer; comparing the image within the second region 305 and the X frames of pictures with the picture of the static object 303, respectively, and determining, an image of an object, whose position changes relative to the picture of the static object 303, in the image within the second region 305 and the X frames of pictures as the dynamic image 302; and accordingly, determining an image of an object, whose position remains unchanged relative to the picture of the static object 303, in the image within the second region 305 and the X frames of pictures as the static image 301.

At act S33, the first image in which the static image and the dynamic image are determined is input into a matting algorithm model to obtain an independent static image and an independent dynamic image separated from each other.

Figure 10A:
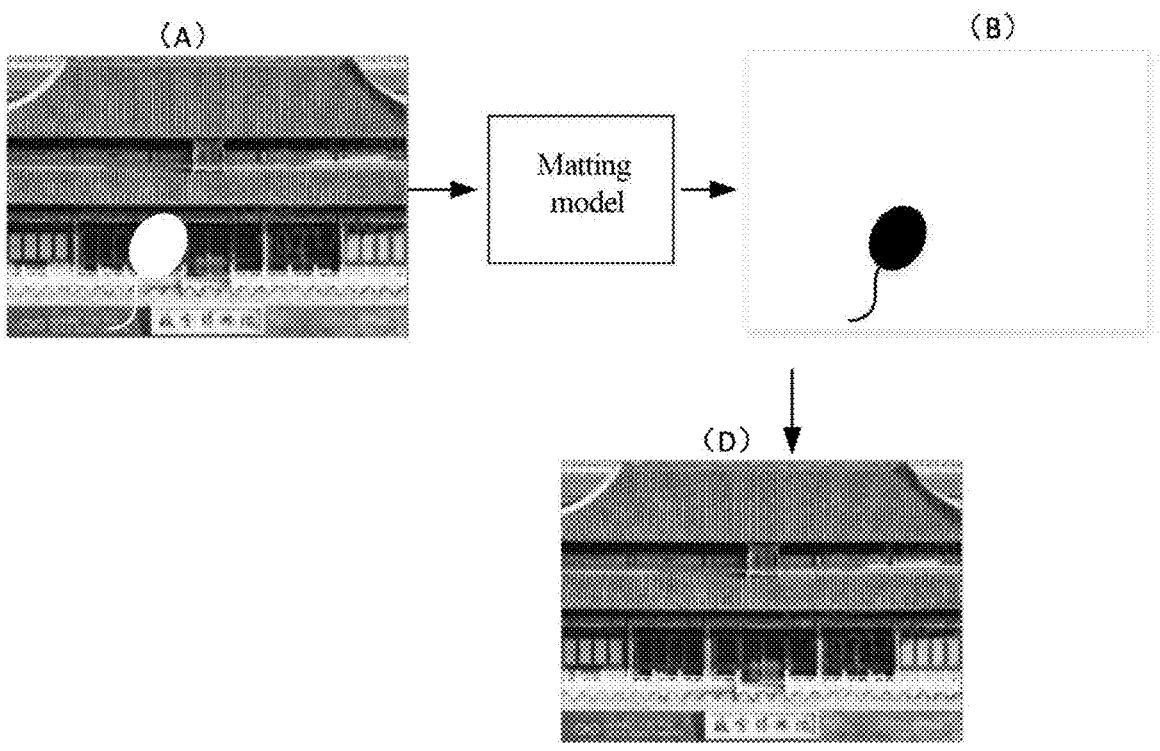
FIG. 10A is a schematic diagram of performing a matting processing on a static image in a first image provided by an embodiment of the present disclosure.

Exemplarily, referring to FIG. 10A, it is a schematic diagram of performing a matting processing on a static image in a first image. The independent static image may be a mask image of the static image in the first image (referring to (B) in FIG. 10A). Exemplarily, a value range of each pixel in the independent static image is [0, 1], reflecting a probability that the pixel of the first image is a static image. It can be understood that in a center region of the static image of the first image, the value of the independent static image is 1, in a region outside the static image of the first image, the value corresponding to the independent static image is 0, and in a boundary region between the static image and the region outside the static image, the value corresponding to the independent static image is between 0 and 1, indicating that the pixels in the boundary region may be a static image, a dynamic image or both. For example, the independent static image may refer to (D) in FIG. 10A.

Figure 10B:
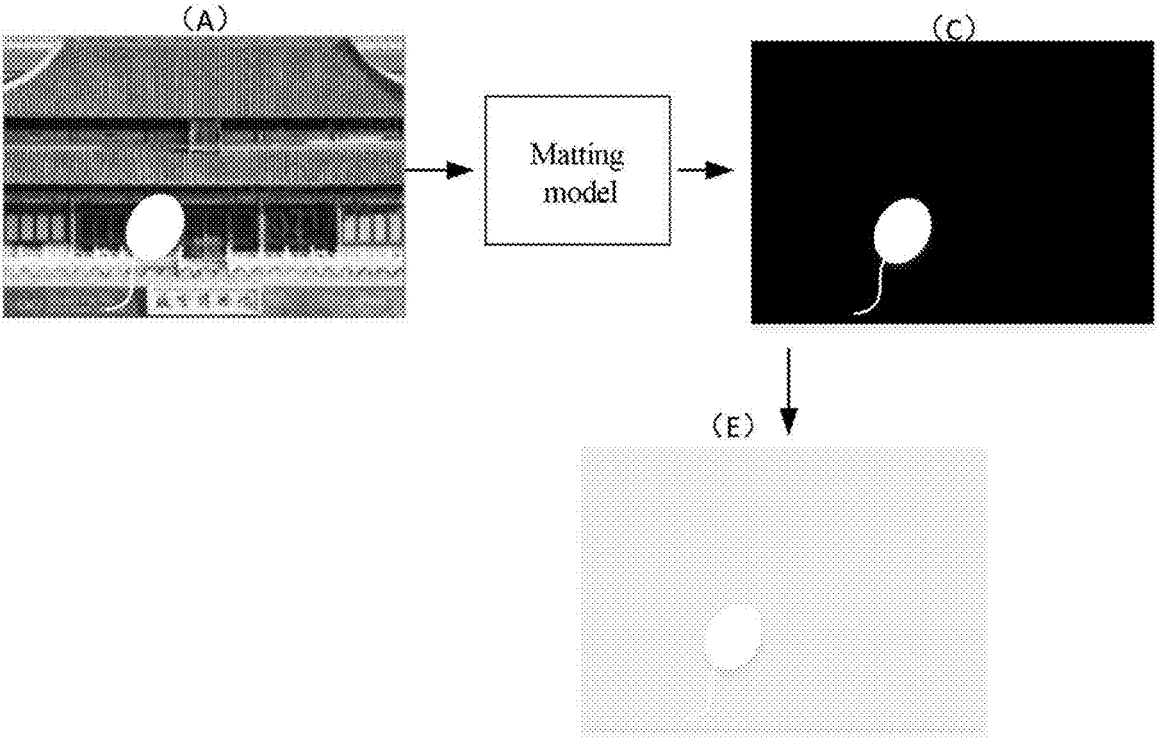
FIG. 10B is a schematic diagram of performing a matting processing on a dynamic image in a first image provided by an embodiment of the present disclosure.

Exemplarily, referring to FIG. 10B, it is a schematic diagram of performing a matting processing on a dynamic image in the first image. The independent dynamic image may be a mask image of the dynamic image in the first image (referring to (C) in FIG. 10B). Exemplarily, a value range of each pixel in the independent dynamic image is [0, 1], reflecting a probability that the pixel of the first image is a dynamic image. It can be understood that in a center region of the dynamic image of the first image, the value of the independent dynamic image is 1, in a region outside the dynamic image of the first image, the value corresponding to the independent dynamic image is 0, and in a boundary region between the dynamic image and the region outside the dynamic image, the value corresponding to the independent dynamic image is between 0 and 1, indicating that the pixels in the boundary region may be a dynamic image, a static image or both. For example, the independent dynamic image may refer to (E) in FIG. 10B.

Exemplarily, the matting model is a pre-trained neural network model. For example, the matting model may be a salient object detection (SOD) model. Herein, the salient target detection model may be a U2-Net model. The salient object detection model is used to distinguish the most attractive object in the image. In a training process, the salient object detection model may be trained by using a training set of a specific type, and thus a target object segmentation model for a specific scene may be trained within short time. For example, by using a large number of static images to train the salient target detection model, the matting model obtained is more efficient in the segmentation processing of static images, and can achieve a better segmentation effect. For another example, by using a large number of dynamic images to train the salient target detection model, the matting model obtained is more efficient in the segmentation processing of dynamic images, and can achieve a better segmentation effect.

In some other implementations, when the target object is a static image or a dynamic image, the image processing model may also be another neural network model for segmenting static images or dynamic images, such as a deep convolutional neural network (DCNN) model for portrait segmentation inference. The DCNN model may perform a portrait mask inference on the first image, and the mask image output by the DCNN model is a portrait dynamic image.

In some embodiments, the first image is input into a matting algorithm model that matches the type of the first image according to the type of the first image. For example, if the first image is a static image, the training set of the matting algorithm model is selected as a static image, which is more accurate for the segmentation effect of the static image. For another example, if the first image is a dynamic image, the training set of the matting algorithm model should be selected as a dynamic image, which is more accurate for the segmentation effect of the dynamic image.

In some embodiments, the first image is input into a matting algorithm model that matches a resolution of the first image according to the resolution of the first image. For example, if the resolution of the first image is very high, the matting algorithm model with a higher matting processing resolution is selected. For another example, if the resolution of the first image is far lower than a input image resolution required by the matting algorithm model, such as an interpolation is greater than the size of the first image by 100%, the image will be distorted due to excessive interpolations, so it needs to select a matting algorithm model with a lower matting processing resolution.

In some embodiments, the matting algorithm model may also be any one of a Tripicture-based model, a Deep Image Matting model, a Background Matting model, a Background Matting V2 model, a Tripicture-free model, a Semantic Human Matting model, and a Modnet model.

At act S34, the independent static image and the independent dynamic image are input into a super-resolution algorithm model respectively to obtain a target static image and a target dynamic image.

Exemplarily, the super-resolution is an underlying image processing task, which maps a low-resolution image to be a high resolution image, amplifying a low-resolution picture into a high-resolution picture in order to enhance image details. Exemplarily, the resolution of the first image is any one of 2k, 4k, and 8k. The first image includes an independent static image and an independent dynamic image, the first image is shown in FIG. 2 (C), and the target image is shown in FIG. 2 (D).

Figure 11:
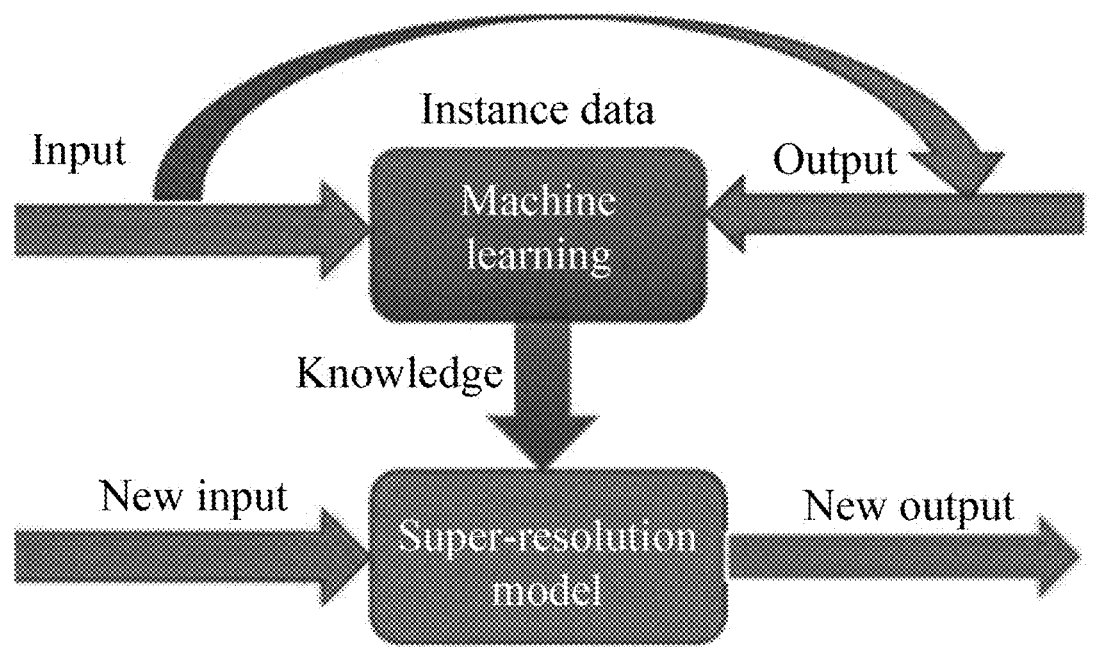
FIG. 11 is a schematic diagram of an establishment and application of a super-resolution model.

Exemplarily, the super-resolution model may select a deep learning model such as DUF, EDVR, RFDN, UNet, etc. Referring to FIG. 11, it is a schematic diagram of an establishment and application of a super-resolution algorithm model. Deep learning model is to accumulate and learn a large number of high-resolution images to perform a module training, then input low-resolution images into the trained module to obtain high-resolution images, and finally image restoring is performed on the obtained high-resolution images, thereby obtaining better image restoration effect and improving image recognition ability and recognition accuracy.

The training principle of super-resolution algorithm model is as follows. (1) The high-resolution image is firstly degraded according to a degrading model to generate a training model.

(2) The image is divided into blocks according to a corresponding relationship between a low frequency portion and a high frequency portion of the high resolution image, and prior knowledge is obtained by learning using a certain algorithm, and a learning model is established.

(3) The most matched high-frequency block is researched in the established training set according to the input low-resolution block.

Figure 12:
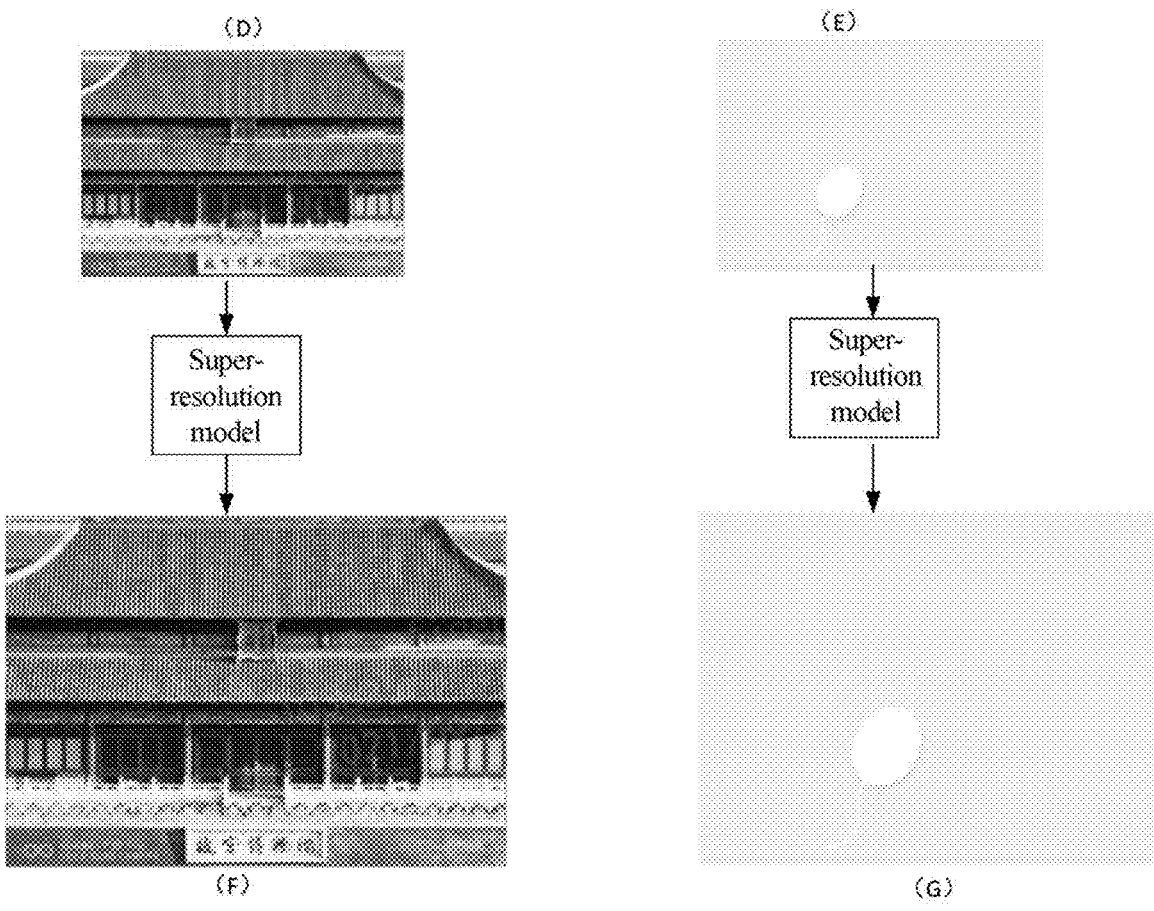
FIG. 12 is a schematic diagram of obtaining a target static image and a target dynamic image by performing super-resolution processings on an independent static image and an independent dynamic image.

In some embodiments, referring to FIG. 12, it is a schematic diagram of a target static image and a target dynamic image obtained by super-resolution processing of an independent static image and an independent dynamic image. Referring to (F) in FIG. 12, the independent static image (referred to as (D) in FIG. 10A) is input to a super-resolution algorithm model, and the target static image is obtained after a super-resolution processing on the independent static image, wherein a resolution of the target static image is higher than that of the independent static image. Referring to (G) in FIG. 12, the independent dynamic image (referred to as (E) in FIG. 10B) is input to a super-resolution algorithm model, and the target dynamic image is obtained after a super-resolution processing on the independent dynamic image, wherein a resolution of the target dynamic image is higher than that of the independent dynamic image.

In some embodiments, in a time axis sequence, a super-resolution processing is performed on the independent static image at an interval of a set time period; and a super-resolution processing is performed in real time on the independent dynamic image. For example, a super-resolution processing is performed once on an independent static image at an interval of 1 second or 10 seconds. A super-resolution processing may also be performed on the independent static image once at an interval of 5 seconds or 15 seconds. A super-resolution processing may also be performed on the independent static image in real time. There is no specific limitation to the interval of a set time period, which may be set by users at will.

At act S35, the target static image and the target dynamic image are superimposed to obtain the target image.

Figures 13, 14, 15:
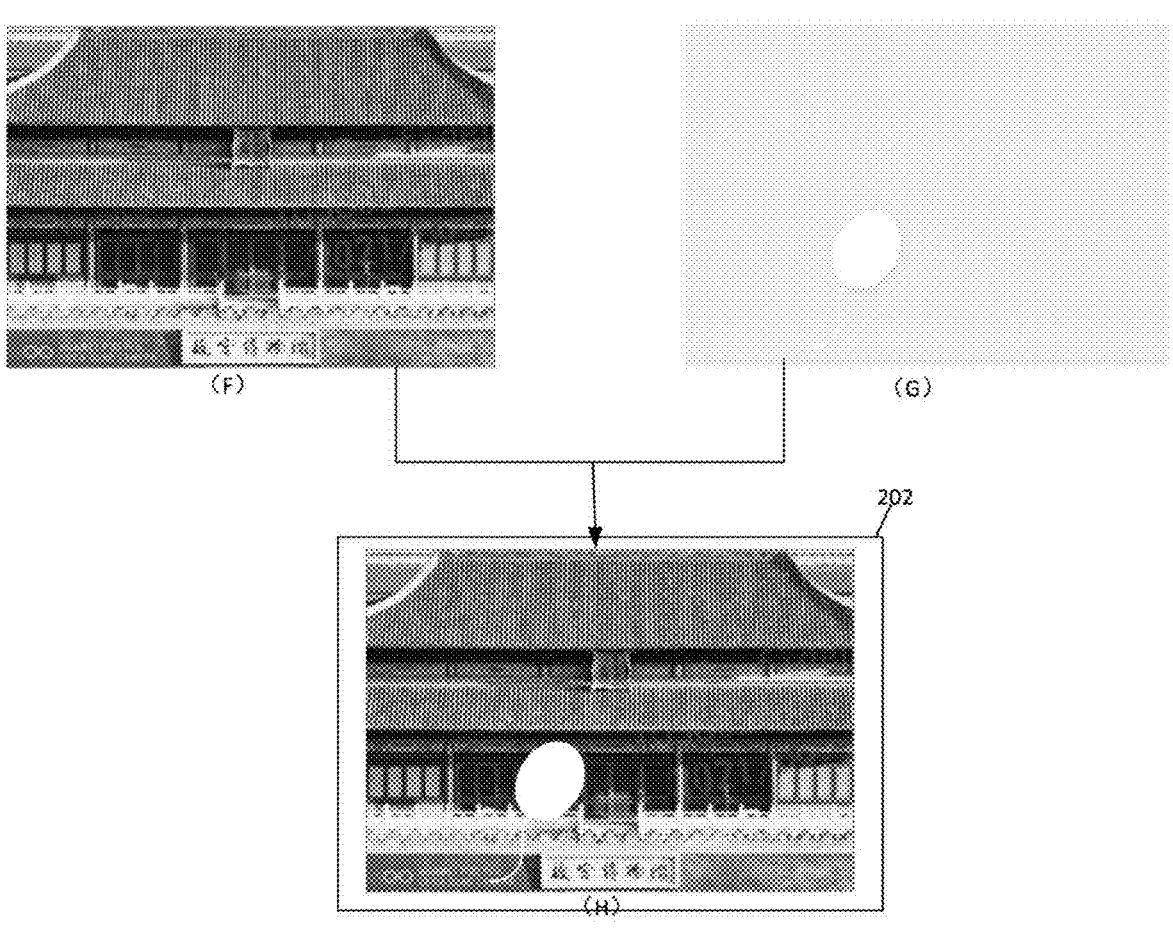
FIG. 13 is a schematic diagram of obtaining a target image by superimposing a target static image and a target dynamic image.
FIG. 14 is a schematic block diagram of an image processing apparatus provided by an embodiment of the present disclosure.
FIG. 15 is a schematic block diagram of an image processing system provided by the embodiment of the present disclosure.

Exemplarily, the target static image and the target dynamic image are superimposed, and referring to FIG. 13, it is a schematic diagram of the target image obtained by superimposing the target static image and the target dynamic image. Herein, the target static image is the (F) in FIG. 12, and the target dynamic image is the (G) in FIG. 12. Superimposing the target static image and the target dynamic image to obtain the target image which is (H) in FIG. 13 includes following acts.

1) The images are merged.

According to the mask image, the target static image is merged with the target dynamic image. Herein, the merged image satisfies the formula:

$$I_{fusion1}=I_{person}{\times}I_{mask}+I_{background}{\times}(1-I_{mask}),$$

wherein, $I_{fusion1}$ represents the merged image, $I_{person}$ represents the target dynamic image, $I_{background}$ represents the target static image, $I_{mask}$ represents a mask image, and a value range of each element in $I_{mask}$ is [0, 1].

It may be understood that the mask image is traversed pixel by pixel, a region of the target dynamic image of the first image is intercepted and collaged into the target static image, and the target dynamic image covers the original image of a corresponding region of the target static image to obtain the merged image. Since a value of the corresponding mask image is between 0 and 1 in a boundary region between the target dynamic image and the target static image of the first image, which has certain transparency, instead of having a clear boundary such as being either 0 or 1, the merged image will transition naturally at edges. For example, if a value of a certain pixel at the boundary of the mask image is 0.3, a target dynamic image with a pixel of 0.3 and a target static image with a pixel of 0.7 are merged to form the merged image at this pixel, and thus the boundary transitions naturally and unobtrusively.

2) The images are fused.

It can be understood that, since a brightness, a saturation and a clarity of the target dynamic image and those of the target static image may be inconsistent, one or more fusion processing operations in brightness adjustment, contrast adjustment, color adjustment, saturation adjustment and Gaussian filtering are performed on the merged image is performed to generate a fused image of the target dynamic image and the target static image.

Exemplarily, assuming that the brightness of the target dynamic image is 50 and the brightness of the target static image is 100, the brightness adjustment is performed on the merged image to adjust the brightness of the merged image as 80, so that the overall brightness of the fused image is consistent, and there are no obvious boundary and brightness difference between the target dynamic image and the target static image.

Exemplarily, a resolution of the target static image is 7680×4320, and a resolution of the target dynamic image is also 7680×4320.

It may be understood that one or more of the above fusion processing operations of brightness adjustment, contrast adjustment, color adjustment, saturation adjustment, Gaussian filtering may be achieved by performing a whole processing on the merged image using a corresponding image processing function, or may be achieved by performing a separate processing on the target dynamic image or the target static image using a corresponding image processing function.

In some embodiments, the image processing method further includes act S36. At the act S36, the target image is input into a data zoom model to obtain an amplified target image.

Digital zoom is also called Digital Zoom. Digital Zoom increases an area of each pixel within the picture through the processor within the digital camera, so as to achieve a purpose of amplification. This technique is like using an image processing software to amplify an area of a picture, however a program is performed in a digital camera to amplify a part of the pixels on an original CCD image sensor by using an "interpolation" processing mode, and to amplify the pixels on the CCD image sensor to a whole picture by using an interpolation algorithm.

At act S4, a first interface is provided, and a target image is displayed on the first interface.

Exemplarily, referring to (H) in FIG. 13, the first interface 202 displays the target image.

The above image processing method can perform a matting, super-resolution, superposition and data zoom processings on a local region of a ultra-high-definition video, thereby further obtain the ultra-high-definition video in the local region, enabling users to see smaller details of the local region of the ultra-high-definition video in the security scene, and improving the user experience. In addition, the image processing method does not need the user to perform redundant operations, thus improving the image processing efficiency.

An embodiment of the present disclosure also provides an image processing apparatus, and referring to FIG. 14, it is a schematic diagram of an image processing apparatus provided by an embodiment of the present disclosure. The image processing apparatus includes a memory 401, storing one or more computer programs therein; a processor 402, coupled to the memory 401 and configured to execute a computer program to implement the above image processing method.

Exemplarily, the processor 402 is coupled to the memory 401 through, for example, an I/O interface, thus achieving information interaction.

Exemplarily, the above processor 402 may be a processor or a collective name of a plurality of processing elements. For example, the processor 402 may be a central processing unit (CPU), a microprocessor, an application specific integrated circuit (ASIC), or one or more integrated circuits for controlling program execution of a solution of the present disclosure, for example, one or more microprocessors. For another example, the processor 402 may be a programmable device, which is, for example, a Complex Programmable Logic Device (CPLD), an Erasable Programmable Logic Device (EPLD) or a field-programmable gate array (FPGA).

The above memory 401 may be a memory or a collective name of the plurality of memory elements, and it is configured to store executable program codes and the like. And the memory 401 may include a random access memory, and may also include a non-volatile memory such as a disk memory and a flash memory, and the like.

The memory 401 is configured to store application program codes executing the solution of the present disclosure, and the application program codes are controlled and executed by the processor 402. The processor 402 is configured to execute the application program codes stored in the memory 401 to control the image processing apparatus to implement the image processing method provided by any of the above embodiments of the present disclosure.

The beneficial effects of the above image processing apparatus are the same as those of the image processing methods described in some of the above embodiments, and will not be described repeatedly here.

An embodiment of the present disclosure also provides a non-transient computer-readable storage medium (e.g., a non-transitory computer-readable storage medium) that stores a computer program which, when running on the computer, enables the computer to implement the image processing method in any of the above embodiments.

Exemplarily, the computer-readable storage medium may include, but is not limited to, a magnetic storage device (e.g. a hard disk, floppy disk, magnetic tape, etc.), an optical disk (e.g. a CD (Compact Disk), DVD (Digital Versatile Disk), a smart card, and a flash memory device (e.g. EPROM (Erasable Programmable Read-Only Memory), a card, stick, or key driver, etc.). The various computer-readable storage media described herein may represent one or more devices and/or other machine-readable storage media for storing information. The term "machine-readable storage medium" may include, but is not limited to, wireless channels and various other media capable of storing, containing, and/or carrying instructions and/or data.

The beneficial effects of the above non-transient computer-readable storage medium are the same as those of the image processing methods described in some of the above embodiments, and will not be repeated here.

An embodiment of the present disclosure also provides an electronic device, including an image processing apparatus and a display apparatus in the above embodiments, wherein the display apparatus is configured to serve as a first interface.

The display apparatus is a display terminal with a high resolution (such as 8K). For example, the display apparatus may project the target image displayed on the first interface to an outdoor 8K large screen, and the display apparatus may also be an 8K TV.

The beneficial effects of the above electronic apparatus are the same as those of the image processing methods described in some of the above embodiments, and will not be described repeatedly here.

Figure 16:
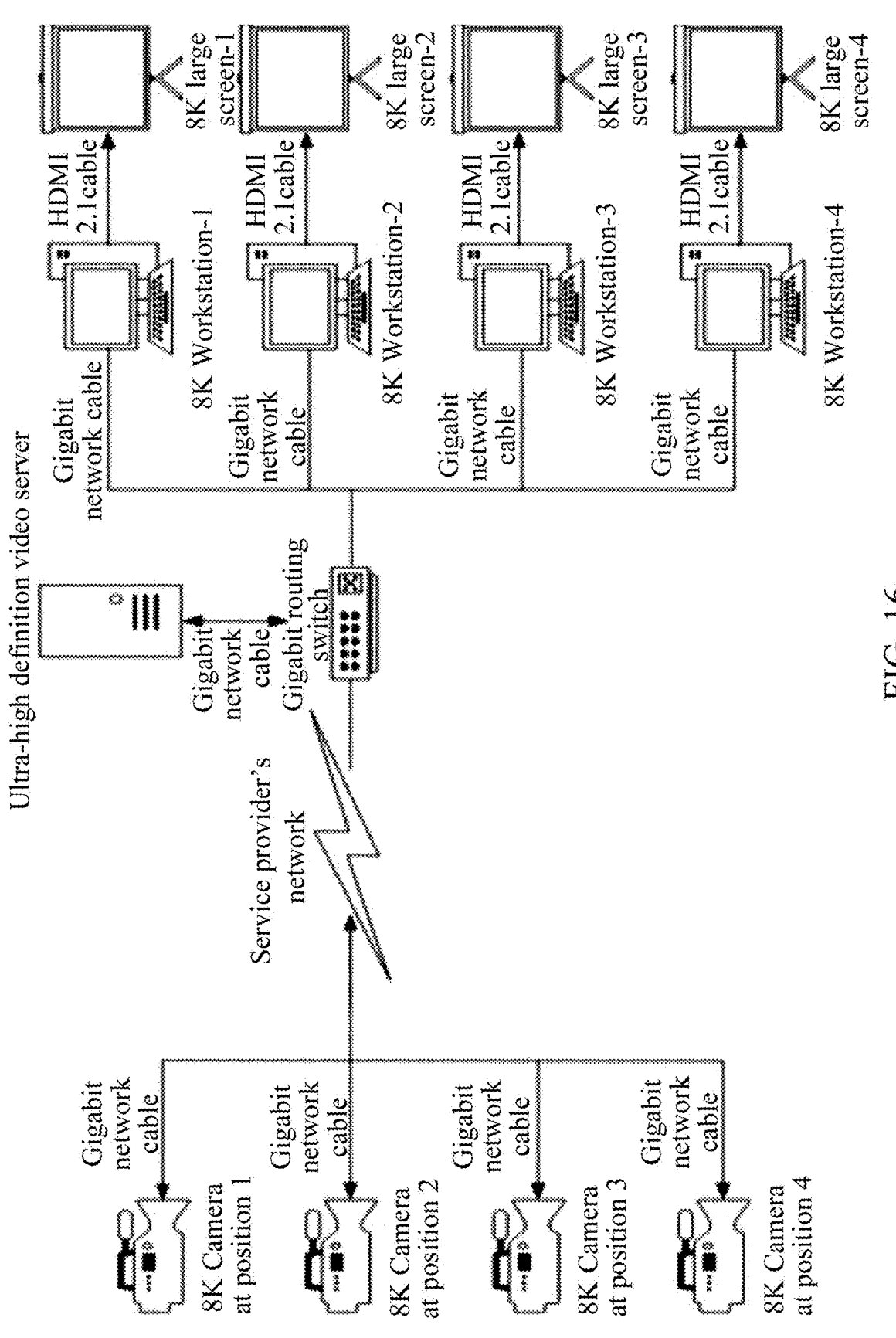
FIG. 16 is a topological diagram of an image processing system provided by an embodiment of the present disclosure.

An embodiment of the present disclosure also provides an image processing system. Referring to FIG. 15 and FIG. 16, FIG. 15 is a schematic block diagram of an image processing system provided by an embodiment of the present disclosure, and FIG. 16 is a topological graph of an image processing system provided by an embodiment of the present disclosure. The image processing system includes the above image processing apparatus 501, and further includes a video image acquisition apparatus 502, a video image transmission processing apparatus 503 and a display apparatus 504. The video image acquisition apparatus 502 acquires real-time video images and transmits them to the video image transmission processing apparatus 503. The video image transmission processing apparatus 503 receives real-time video images and transmits them to the image processing apparatus 501. The image processing apparatus 501 processes the real-time video images to obtain a target image and transmits the target image to the display apparatus 504. The display apparatus 504 receives the target image and displays it.

In some embodiments, the display apparatus 504 is a projection screen or display terminal with a resolution consistent with that of the target image. Exemplarily, the video image acquisition apparatus 502 employs a multi-channel 8K ultra-high definition security camera. The video image transmission processing apparatus 503 employs a content distribution network streaming media server (i.e. an ultra-high definition video server). The image processing apparatus 501 and the display apparatus 504 employ a video stream screen projection control workstation and a projection screen, respectively.

Exemplarily, the specific work flow of the image processing system is as follows: 8K ultra-high definition security video images are acquired by a camera and encoded to form a video stream of H.265 (a compressed video coding standard), and then the video stream is pushed to an 8K ultra-high definition content distribution network streaming media server through an RTMP (Real Time Messaging Protocol) or RTSP (Real Time Streaming Protocol, RFC2326) network protocol; and then the video stream screen projection control workstation obtains the video stream from the 8K ultra-high definition content distribution network streaming media server through an HTTP (Hyper Text Transfer Protocol) or RTMP network protocol, obtains the target image after an image processing is performed on the video stream, and displays the target image on the 8K large screen.

The following is a detailed description of the functions of four apparatuses in the image processing system.

The 8K ultra-high definition security camera is mainly responsible for 8K video acquisition, and encoding and outputting video streams with a resolution of 2K (1920×1080), 4K (4096×2160) or 8K (7680×4320), and pushes the video streams to the ultra-high definition content distribution network streaming media server through the network in an H.265 encoding format. In some embodiments, the 8K ultra-high definition security camera may be set to include multiple ones, which capture 8K video images, respectively.

The content distribution network streaming media server is mainly responsible for receiving and forwarding 2K, 4K or 8K video streams. The features of it functions include: efficient H.265 format, 8K ultra-high bit stream processing engine, high concurrency framework design, flexible data transmission, safe port management, multiple anti-theft chain processing, intelligent data management, and data visualization module.

The video stream screen projection control workstation is mainly responsible for decoding, displaying and outputting 2K, 4K or 8K video streams. The features of its functions include: 8K large format real-time projection display, real-time selection region tracking display, multi-channel big data rendering, seamless rendering mixed cutting technology, real-time GPU rendering acceleration, high-speed IO transmission, real-time marking module, picture layer adjustment processing function, real-time color adjustment, and remote camera control module, etc. In some embodiments, the video stream screen projection control workstations may be multiple, which performs image processing and outputting for different video streams, respectively.

The projection screen, for example, a 8K large screen, is mainly responsible for terminal display of 8K video streams, for example, outdoor 8K large screen or 8K TV. In some embodiments, the projection screen may be multiple, which displays video streams output by different video stream screen projection control workstations, respectively.

The beneficial effects of the above image processing system are the same as those of the image processing methods described in some of the above embodiments, and will not be described repeatedly here.

It may be understood that the above embodiments are only exemplary embodiments for the purpose of illustrating the principles of the present disclosure, however the present disclosure is not limited thereto. To those of ordinary skills in the art, various modifications and improvements may be made without departing from the spirit and essence of the present disclosure, and these modifications and improvements are also considered to be within the scope of the present disclosure.

The invention claimed is:

1. An image processing method, comprising:
acquiring real-time video images;
selecting a target region on an image frame, at a selected moment, of the real-time video images;
inputting a first image of the target region into an image processing model to obtain a target image; wherein a resolution of the target image is higher than a resolution of the first image; and
providing a first interface and displaying the target image on the first interface;
wherein the inputting the first image of the target region into the image processing model to obtain the target image comprises:
acquiring, in a time axis sequence, a picture of a current frame, corresponding to the selected moment, of the target region of the real-time video images, and pictures of M frames preceding the picture of the current frame and pictures of N frames behind the picture of the current frame, wherein M>N>0, and M and N are integers;
determining a static image and a dynamic image in the first image according to the picture of the current frame, and the pictures of M frames preceding the picture of the current frame and the pictures of N frames behind the picture of the current frame; wherein the static image is an image of an object in the first image whose position remains unchanged relative to the pictures of M frames preceding the picture of the current frame and the pictures of N frames behind the picture of the current frame; and the dynamic image is an image of an object in the first image whose position changes relative to the pictures of M frames preceding the picture of the current frame and the pictures of N frames behind the picture of the current frame;
inputting the first image in which the static image and the dynamic image are determined into a matting algorithm model to obtain an independent static image and an independent dynamic image separated from each other;
inputting the independent static image and the independent dynamic image into a super-resolution algorithm model respectively to obtain a target static image and a target dynamic image; and
superimposing the target static image and the target dynamic image to obtain the target image.

2. The image processing method according to claim 1, wherein the selecting the target region on the image frame, at the selected moment, of the real-time video images comprises:
receiving a first instruction input by a user; and
selecting the target region on the image frame, at the selected moment, of the real-time video images in response to the first instruction.

3. The image processing method according to claim 1, wherein the determining the static image and the dynamic image in the first image according to the picture of the current frame and the pictures of M frames preceding the picture of the current frame and the pictures of N frames behind the picture of the current frame comprises:
comparing the first image of the picture of the current frame with the pictures of M frames preceding the picture of the current frame and the pictures of N frames behind the picture of the current frame, recognizing an image of an object in the first image whose position remains unchanged relative to the pictures of M frames preceding the picture of the current frame and the pictures of N frames behind the picture of the current frame, and determining the image as the static image; and
comparing the first image of the picture of the current frame with the pictures of M frames preceding the picture of the current frame and the pictures of N frames behind the picture of the current frame, recognizing an image of an object in the first image whose position changes relative to the pictures of M frames preceding the picture of the current frame and the pictures of N frames behind the picture of the current frame, and determining the image as the dynamic image.

4. The image processing method according to claim 1, wherein the determining the static image and the dynamic image in the first image according to the picture of the current frame and the pictures of M frames preceding the picture of the current frame and the pictures of N frames behind the picture of the current frame comprises:
extracting, in a time axis sequence, at an interval of a set time period, one-frame picture from the picture of the current frame and the pictures of M frames preceding the picture of the current frame and the pictures of N frames behind the picture of the current frame to obtain X frames of pictures; wherein $0 < X < M+N+1$, and X is an integer; and
comparing the first image of the picture of the current frame with the X frames of pictures, recognizing an image of an object in the first image whose position remains unchanged relative to the X frames of pictures, and determining the image as the static image; and comparing the first image of the picture of the current frame with the X frames of pictures, recognizing an image of an object in the first image whose position changes relative to the X frames of pictures, and determining the image as the dynamic image.

5. The image processing method according to claim 1, wherein the determining the static image and the dynamic image in the first image according to the picture of the current frame and the pictures of M frames preceding the picture of the current frame and the pictures of N frames behind the picture of the current frame comprises:

receiving a picture of a static object input by a user, wherein the static object is a static object in the first image;

comparing the first image of the picture of the current frame and the pictures of M frames preceding the picture of the current frame and the pictures of N frames behind the picture of the current frame with the picture of the static object, respectively, and determining, as the dynamic image, an image of an object, in the first image and the pictures of M frames preceding the picture of the current frame and the pictures of N frames behind the picture of the current frame, whose position changes relative to the picture of the static object.

6. The image processing method according to claim 1, wherein the determining the static image and the dynamic image in the first image according to the picture of the current frame and the pictures of M frames preceding the picture of the current frame and the pictures of N frames behind the picture of the current frame comprises:

receiving a picture of a static object input by a user, wherein the static object is a static object in the first image;

extracting, in a time axis sequence, at an interval of a set time period, one-frame picture from the picture of the current frame and the pictures of M frames preceding the picture of the current frame and the pictures of N frames behind the picture of the current frame to obtain X frames of pictures; wherein 0<X<M+N+1, and X is an integer;

comparing the first image of the picture of the current frame and the X frames of pictures with the picture of the static object, respectively, and determining, as the dynamic image, an image of an object, in the first image and the X frames of pictures, whose position changes relative to the picture of the static object.

7. The image processing method according to claim 1, wherein the method further comprises: inputting the target image into a data zoom model to obtain an amplified target image.

8. The image processing method according to claim 1, wherein, in a time axis sequence, one super-resolution processing is performed on the independent static image at an interval of a set time period; and a super-resolution processing is performed in real time on the independent dynamic image.

9. The image processing method according to claim 1, wherein a resolution of the first image is any one of 2k, 4k, and 8k.

10. The image processing method according to claim 1, wherein the target region is a partial region or entire region of the image frame, at the selected moment, of the real-time video images.

11. An image processing apparatus, comprising:

a memory, configured to store one or more computer programs thereon; and a processor, coupled to the memory, and configured to execute the one or more computer programs to implement the image processing method according to claim 1.

12. An image processing system, comprising the image processing apparatus according to claim 11;

further comprising: a camera, a content distribution network streaming media server and a display terminal;

the camera acquires real-time video images and transmits the real-time video images to the video image transmission processing apparatus;

the content distribution network streaming media server apparatus receives the real-time video images and transmits the real-time video images to the image processing apparatus;

the image processing apparatus processes the real-time video images to obtain a target image and transmits the target image to the display terminal; and the display terminal receives and displays the target image.

13. The image processing system according to claim 12, wherein the display terminal has a resolution consistent with a resolution of the target image.

14. A non-transitory computer-readable storage medium, storing a computer program which, when running on a computer, enables the computer to implement the image processing method according to claim 1.

15. An image processing method, comprising:

acquiring real-time video images;

selecting a target region on an image frame, at a selected moment, of the real-time video images;

inputting a first image of the target region into an image processing model to obtain a target image; wherein a resolution of the target image is higher than a resolution of the first image; and providing a first interface and displaying the target image on the first interface;

wherein the inputting the first image of the target region into the image processing model to obtain the target image, comprises:

acquiring, in a time axis sequence, a picture of a current frame, corresponding to the selected moment, of the target region of the real-time video images, and pictures of M frames preceding the picture of the current frame and pictures of N frames behind the picture of the current frame, wherein M>N>0, and M and N are integers;

dividing the first image into a first region and a second region, wherein an image in the first region is a static image, and an image in the second region are a static image and a dynamic image; wherein the static image is an image of an object in the first image whose position remains unchanged relative to the pictures of M frames preceding the picture of the current frame and the pictures of N frames behind the picture of the current frame, and the dynamic image is an image of an object in the first image whose position changes relative to the pictures of M frames preceding the picture of the current frame and the pictures of N frames behind the picture of the current frame;

determining the static image and dynamic image in the image in the second region according to the picture of the current frame, and pictures of M frames preceding the picture of the current frame and pictures of N frames behind the picture of the current frame;

inputting the first image in which the static image and the dynamic image are determined into a matting algorithm model to obtain an independent static image and an independent dynamic image separated from each other;

inputting the independent static image and the independent dynamic image into a super-resolution algorithm model respectively to obtain a target static image and a target dynamic image;

superimposing the target static image and the target dynamic image to obtain the target image.

16. The image processing method according to claim 15, wherein the determining the static image and the dynamic image in the image in the second region according to the picture of the current frame and pictures of M frames preceding the picture of the current frame and pictures of N frames behind the picture of the current frame comprises:

comparing the image in the second region with the pictures of M frames preceding the picture of the current frame and the pictures of N frames behind the picture of the current frame, recognizing an image of an object in the image in the second region whose position remains unchanged relative to the pictures of M frames preceding the picture of the current frame and the pictures of N frames behind the picture of the current frame, and determining the image as the static image;

comparing the image in the second region with the pictures of M frames preceding the picture of the current frame and the pictures of N frames behind the picture of the current frame, recognizing an image of an object in the image in the second region whose position changes relative to the pictures of M frames preceding the picture of the current frame and the pictures of N frames behind the picture of the current frame, and determining the image as the dynamic image;

or, extracting, in a time axis sequence, at an interval of a set time period, one-frame picture from the picture of the current frame and pictures of M frames preceding the picture of the current frame and pictures of N frames behind the picture of the current frame to obtain X frames of pictures; wherein $0<X<M+N+1$, and X is an integer;

comparing the image in the second region with the X frames of pictures, recognizing an image of an object in the image in the second region whose position remains unchanged relative to the X frames of pictures, and determining the image as the static image;

comparing the image in the second region with the X frames of pictures, recognizing an image of an object in the image in the second region whose position changes relative to the X frames of pictures, and determining the image as the dynamic image;

or, receiving a picture of a static object input by a user, wherein the static object is a static object in the first image;

comparing the image in the second region and the pictures of M frames preceding the picture of the current frame and the pictures of N frames behind the picture of the current frame with the picture of the static object, respectively, and determining, as the dynamic image, an image of the an object in the image in the second region and the pictures of M frames preceding the picture of the current frame and the pictures of N frames behind the picture of the current frame whose position changes relative to the picture of the static object;

or, receiving a picture of a static object input by a user, wherein the static object is a static object in the first image;

extracting, in a time axis sequence, at an interval of a set time period, one-frame picture from the picture of the current frame the pictures of M frames preceding the picture of the current frame and the pictures of N frames behind the picture of the current frame to obtain X frames of pictures; wherein $0<X<M+N+1$, and X is an integer; and comparing the image in the second region and the X frames of pictures with the picture of the static object, respectively, and determining, as the dynamic image, an image of an object, in the image in the second region and the X frames of pictures, whose position changes relative to the picture of the static object.

17. An image processing apparatus, comprising:

a memory, configured to store one or more computer programs thereon; and a processor, coupled to the memory, and configured to execute the one or more computer programs to implement the image processing method according to claim 15.

18. An image processing system, comprising the image processing apparatus according to claim 17;

further comprising: a camera, a content distribution network streaming media server and a display terminal;

the camera acquires real-time video images and transmits the real-time video images to the video image transmission processing apparatus;

the content distribution network streaming media server receives the real-time video images and transmits the real-time video images to the image processing apparatus;

the image processing apparatus processes the real-time video images to obtain a target image and transmits the target image to the display terminal; and the display terminal receives and displays the target image.

19. A non-transitory computer-readable storage medium, storing a computer program which, when running on a computer, enables the computer to implement the image processing method according to claim 15.

* * * * *